(12) United States Patent
Funka-Lea et al.

(10) Patent No.: US 8,582,848 B2
(45) Date of Patent: Nov. 12, 2013

(54) SYSTEM AND METHOD FOR DETECTION OF ACOUSTIC SHADOWS AND AUTOMATIC ASSESSMENT OF IMAGE USABILITY IN 3D ULTRASOUND IMAGES

(75) Inventors: Gareth Funka-Lea, Cranbury, NJ (US); Jeffrey Stoll, San Mateo, CA (US); Luca Valente, Nice (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 260 days.

(21) Appl. No.: 13/177,050

(22) Filed: Jul. 6, 2011

(65) Prior Publication Data

US 2012/0243757 A1   Sep. 27, 2012

Related U.S. Application Data

(60) Provisional application No. 61/369,259, filed on Jul. 30, 2010.

(51) Int. Cl.
*G06K 9/00* (2006.01)

(52) U.S. Cl.
USPC .............................. 382/128; 128/922; 378/4

(58) Field of Classification Search
USPC .............. 382/100, 128, 129, 130, 131, 132; 128/922; 378/4–27; 600/441, 453, 455, 600/457; 367/87, 94
See application file for complete search history.

(56) References Cited

U.S. PATENT DOCUMENTS

| | | | | |
|---|---|---|---|---|
| 6,718,055 | B1 * | 4/2004 | Suri | 382/128 |
| 6,975,894 | B2 * | 12/2005 | Wehrli et al. | 600/407 |
| 7,020,311 | B2 * | 3/2006 | Breeuwer | 382/128 |
| 7,397,935 | B2 * | 7/2008 | Kimmel et al. | 382/128 |
| 7,460,699 | B2 * | 12/2008 | O'Donnell et al. | 382/128 |
| 7,668,354 | B2 * | 2/2010 | O'Donnell et al. | 382/128 |
| 8,150,123 | B2 * | 4/2012 | Wang et al. | 382/128 |
| 2004/0146193 | A1 * | 7/2004 | Imamura et al. | 382/132 |
| 2008/0188746 | A1 * | 8/2008 | Loupas et al. | 600/441 |
| 2008/0292153 | A1 * | 11/2008 | Binnig et al. | 382/128 |

OTHER PUBLICATIONS

Anant Madabhushi, et al., Distinguishing Lesions From Posterior Acoustic Shadowing in Breast Ultrasound Via Non-Linear Dimensionality Reduction, Proceedings of the 28th IEEE, EMBS Annual International Conference, NY, USA, Aug. 30-Sep. 3, 2006, pp. 3070-3073.

* cited by examiner

*Primary Examiner* — Anand Bhatnagar
(74) *Attorney, Agent, or Firm* — Donald B. Paschburg; F. Chau & Associates, LLC

(57) ABSTRACT

A method for automatically assessing medical ultrasound (US) image usability, includes extracting one or more features from at least one part of a medical ultrasound image, calculating for each feature a feature score for each pixel of the at least one part of the ultrasound image, and classifying one or more image pixels of the at least one part as either usable or unusable, based on a combination of feature scores for each pixel, where usable pixels have intensity values substantially representative of one or more anatomical structures.

23 Claims, 23 Drawing Sheets

(a) (b)

(a)
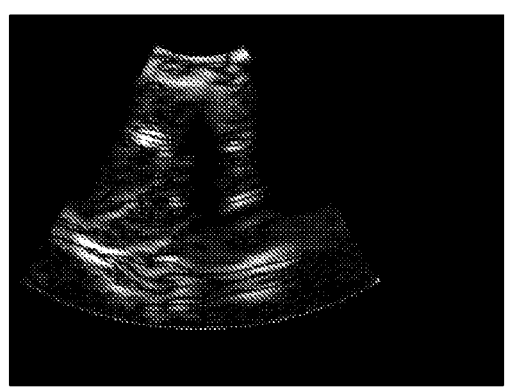
(b)
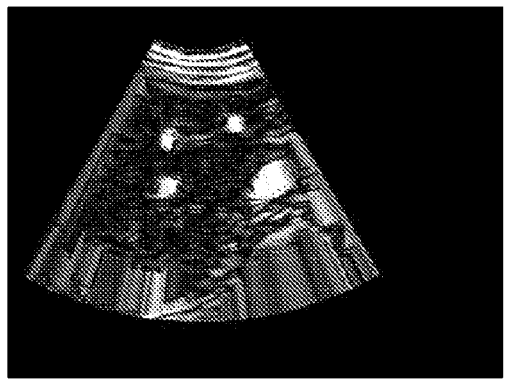
(c)
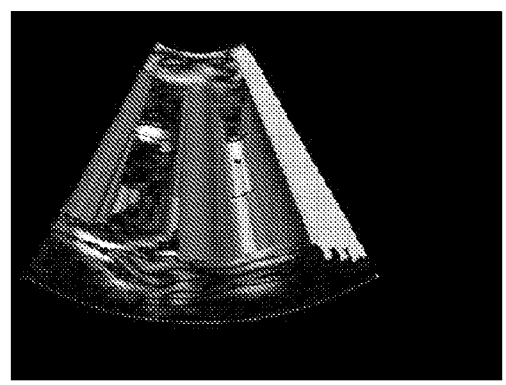
(d)
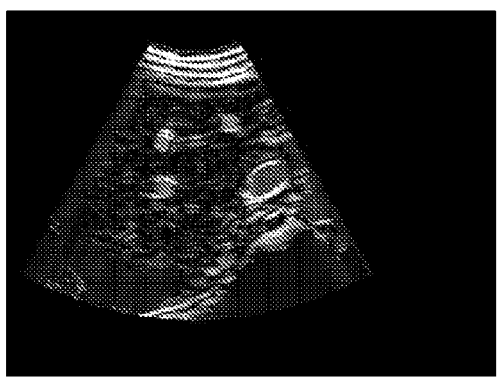
(e)
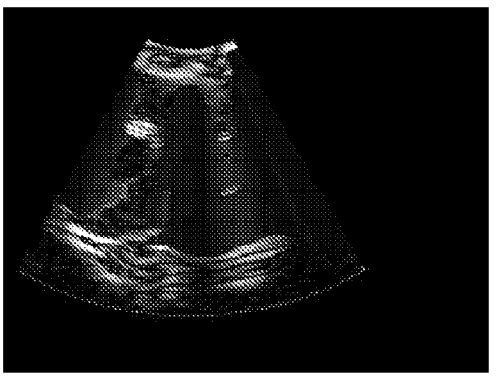
(f)
FIG. 8

(a)          (b)

| Auto/GT | Label 1 | Label 2 | Label 3 |
|---|---|---|---|
| Label 1 | 91.01% | 6.22% | 8.52% |
| Label 2 | 1.61% | 71.35% | 1.35% |
| Label 3 | 7.39% | 22.43% | 90.13% |
| All labels | 100.00% | 100.00% | 100.00% |

(a)

| Auto/GT | Non-useful | Useful |
|---|---|---|
| Non-Useful | 91.01% | 8.40% |
| Useful | 8.99% | 91.60% |
| All labels | 100.00% | 100.00% |

(b)

| Auto/GT | Label 1 | Label 2 | Label 3 |
|---|---|---|---|
| Label 1 | 68.29% | 15.64% | 6.10% |
| Label 2 | 3.63% | 49.83% | 3.11% |
| Label 3 | 28.08% | 34.53% | 90.79% |
| All labels | 100.00% | 100.00% | 100.00% |

(c)

| Auto/GT | Non-useful | Useful |
|---|---|---|
| Non-Useful | 68.29% | 6.52% |
| Useful | 31.71% | 93.48% |
| All labels | 100.00% | 100.00% |

(d)

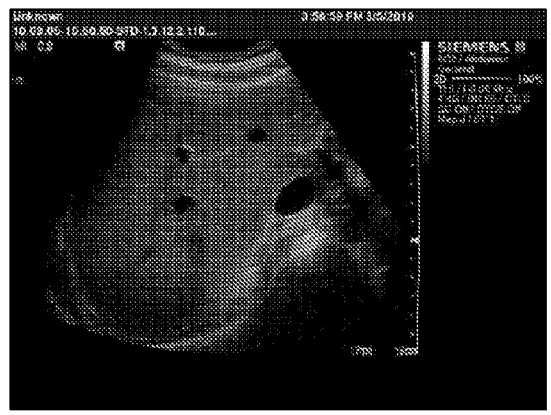
(a)
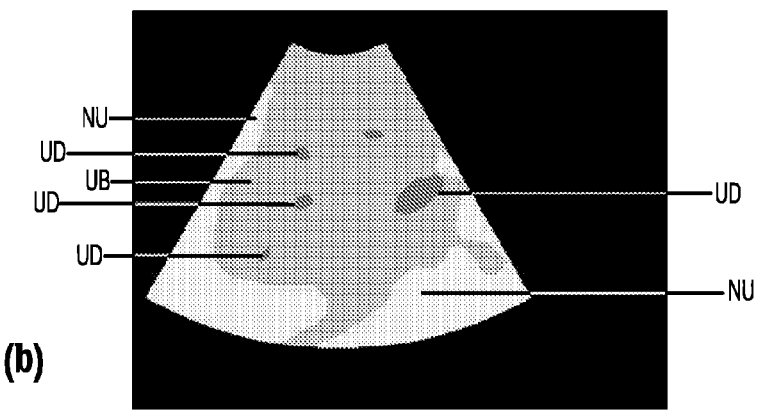
(b)
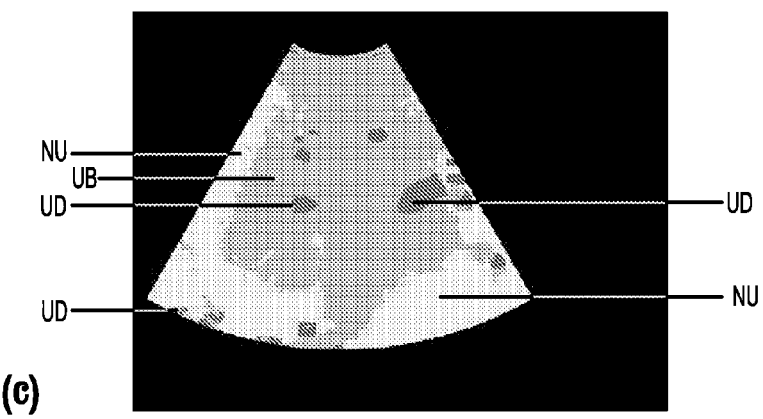
(c)
| Auto/GT | Label 1 | Label 2 | Label 3 |
|---|---|---|---|
| Label 1 | 91.23% | 4.03% | 8.81% |
| Label 2 | 3.22% | 88.09% | 2.05 |
| Label 3 | 5.55% | 7.89% | 89.14% |
| All labels | 100.00% | 100.00% | 100.00% |
FIG. 14: A liver image used for training

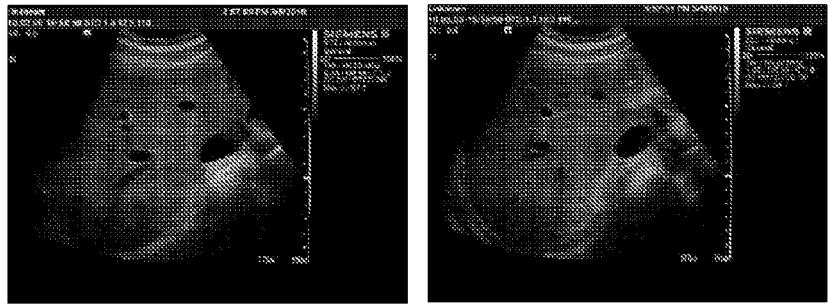
(a)
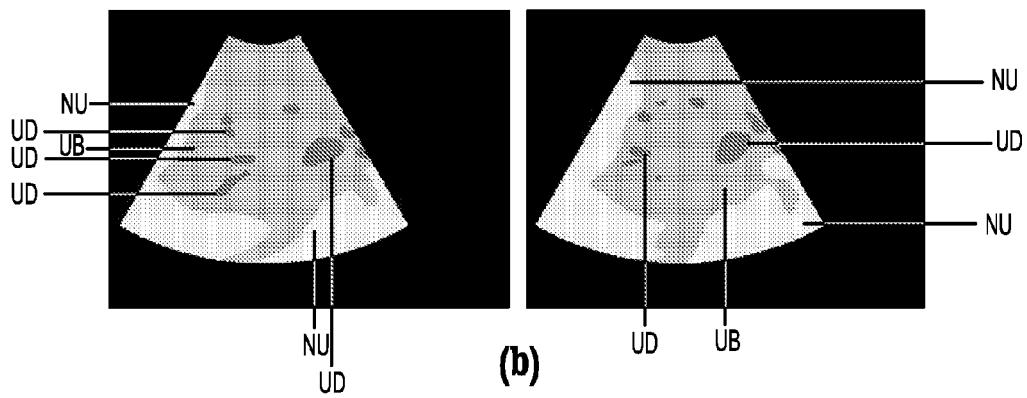
(b)
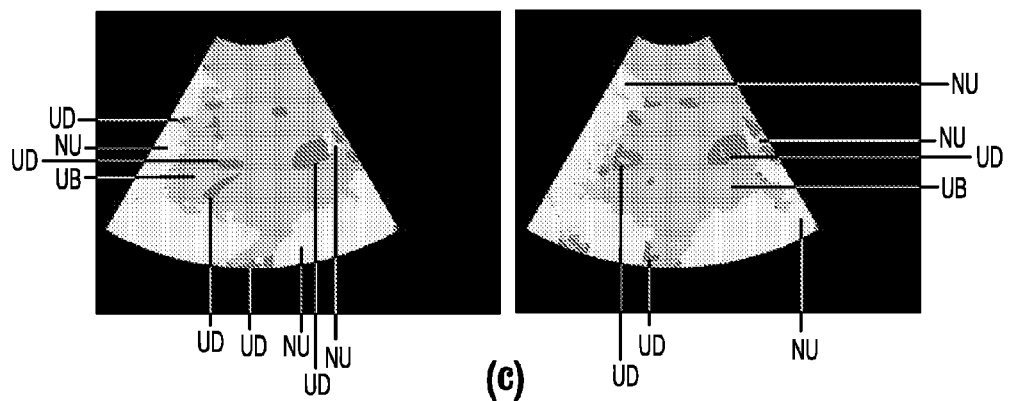
(c)
| Auto/GT | Label 1 | Label 2 | Label 3 |
|---|---|---|---|
| Label 1 | 95.76%. | 4.18% | 11.44% |
| Label 2 | 1.67% | 83.92% | 1.77% |
| Label 3 | 2.57% | 11.90% | 86.78% |
| All labels | 100.00% | 100.00% | 100.00% |
| Auto/GT | Label 1 | Label 2 | Label 3 |
|---|---|---|---|
| Label 1 | 91.90%. | 3.78% | 5.64% |
| Label 2 | 3.00% | 85.85% | 3.42% |
| Label 3 | 5.10% | 10.37% | 90.94% |
| All labels | 100.00% | 100.00% | 100.00% |
FIG. 15: A liver

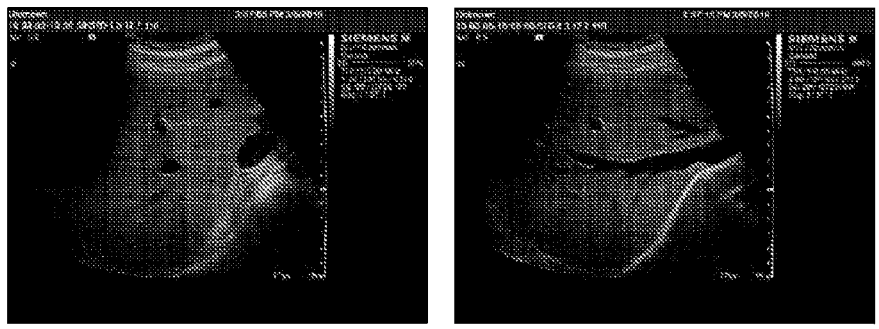
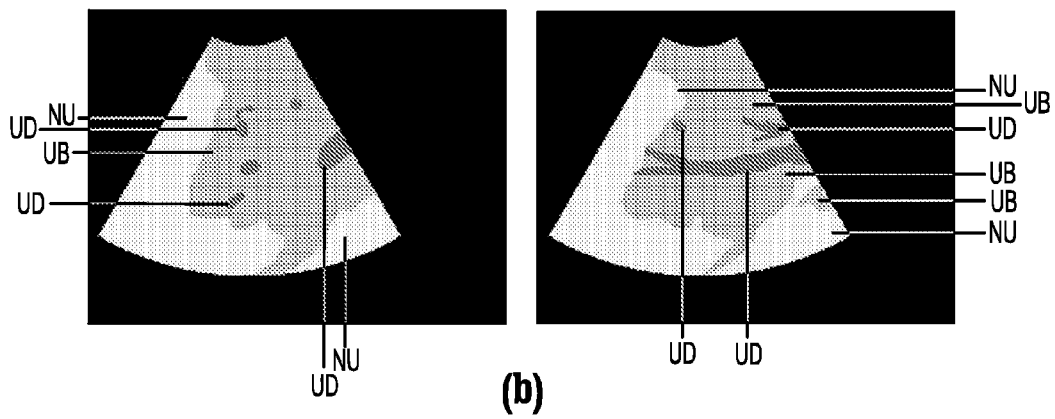
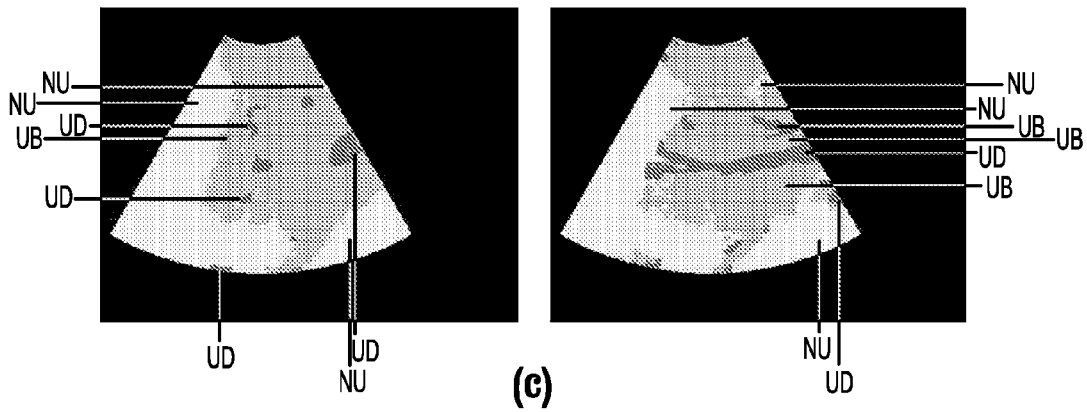
| Auto/GT | Label 1 | Label 2 | Label 3 |
|---|---|---|---|
| Label 1 | 97.89% | 2.82% | 5.89% |
| Label 2 | 0.69% | 84.71% | 0.88% |
| Label 3 | 1.42% | 12.47% | 93.23% |
| All labels | 100.00% | 100.00% | 100.00% |
| Auto/GT | Label 1 | Label 2 | Label 3 |
|---|---|---|---|
| Label 1 | 93.11% | 0.91% | 8.11% |
| Label 2 | 2.29% | 81.78% | 3.06% |
| Label 3 | 4.60% | 17.31% | 88.83% |
| All labels | 100.00% | 100.00% | 100.00% |
FIG. 16: A liver

(a)
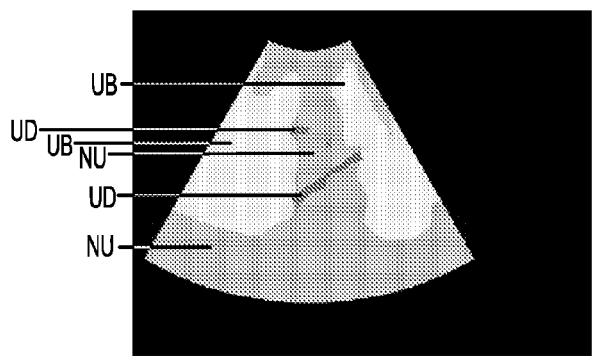
(b)
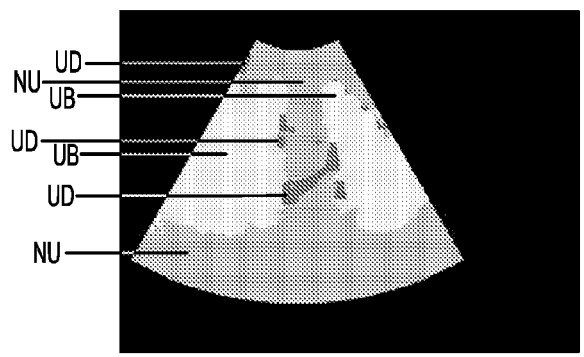
(c)
| Auto/GT | Label 1 | Label 2 | Label 3 |
|---|---|---|---|
| Label 1 | 91.44% | 13.37% | 5.65% |
| Label 2 | 1.26% | 79.81% | 2.42% |
| Label 3 | 7.30% | 6.82% | 91.93% |
| All labels | 100.00% | 100.00% | 100.00% |
FIG. 17: A ribs image used for training

(a)
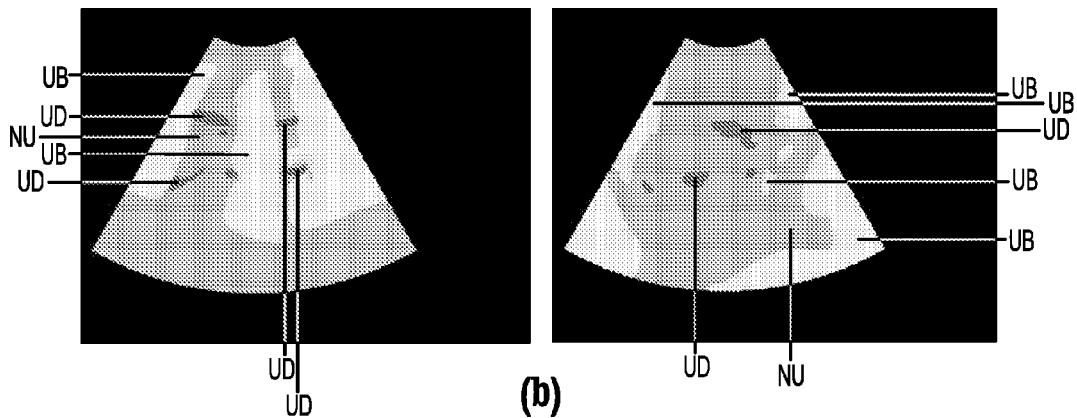
(b)
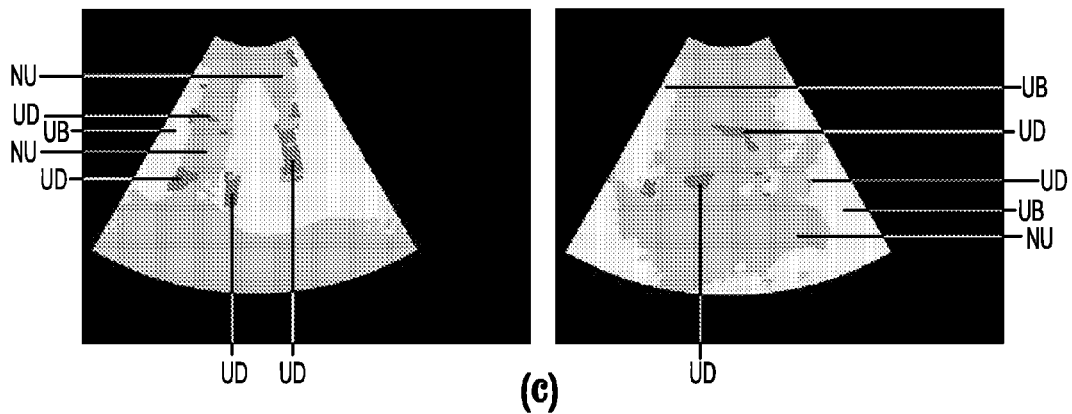
(c)
| Auto/GT | Label 1 | Label 2 | Label 3 |
|---|---|---|---|
| Label 1 | 89.65% | 6.28% | 7.34% |
| Label 2 | 3.83% | 44.62% | 2.89% |
| Label 3 | 6.52% | 49.10% | 89.77% |
| All labels | 100.00% | 100.00% | 100.00% |
| Auto/GT | Label 1 | Label 2 | Label 3 |
|---|---|---|---|
| Label 1 | 94.09% | 0.82% | 11.46% |
| Label 2 | 0.34% | 73.58% | 0.68% |
| Label 3 | 5.57% | 25.60% | 87.87% |
| All labels | 100.00% | 100.00% | 100.00% |
FIG. 18: Ribs

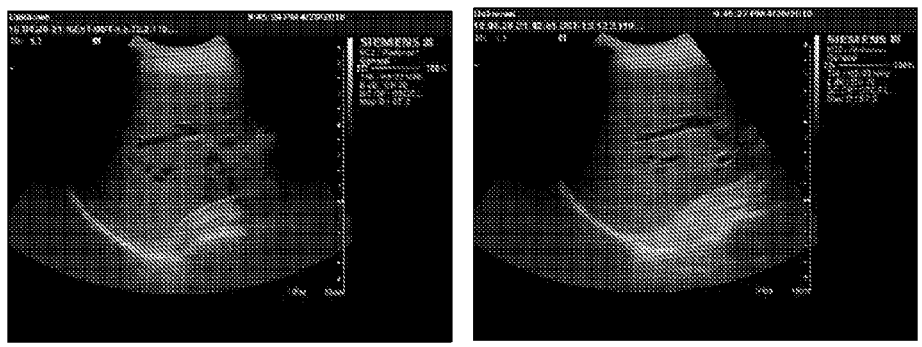
(a)
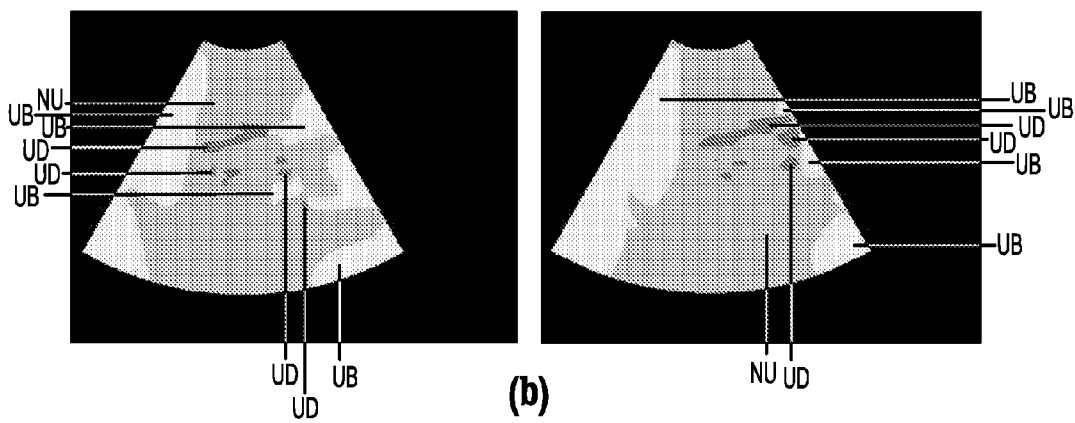
(b)
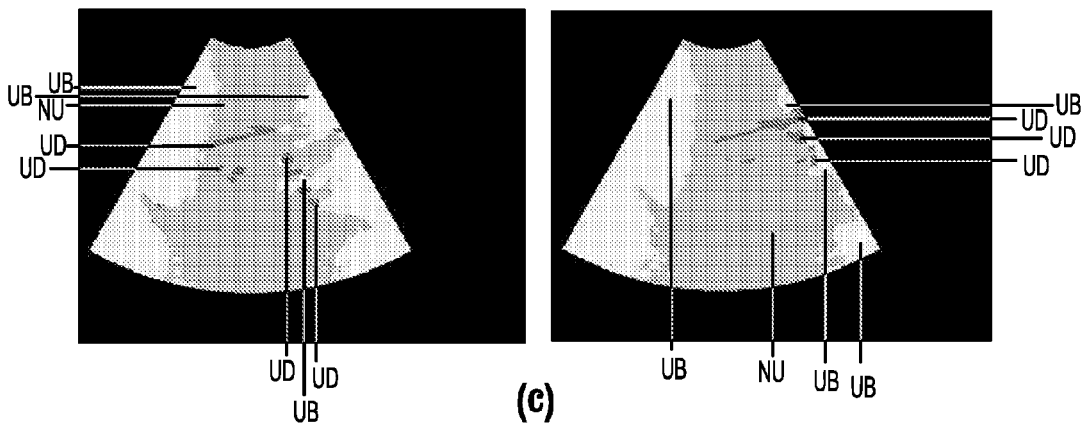
(c)
| Auto/GT | Label 1 | Label 2 | Label 3 |
|---|---|---|---|
| Label 1 | 92.73% | 0.33% | 13.59% |
| Label 2 | 0.79% | 61.81% | 0.53% |
| Label 3 | 6.48% | 37.86% | 85.88% |
| All labels | 100.00% | 100.00% | 100.00% |
| Auto/GT | Label 1 | Label 2 | Label 3 |
|---|---|---|---|
| Label 1 | 94.46% | 4.11% | 7.15% |
| Label 2 | 0.62% | 48.49% | 0.45% |
| Label 3 | 4.92% | 47.40% | 92.40% |
| All labels | 100.00% | 100.00% | 100.00% |
FIG. 19: Ribs

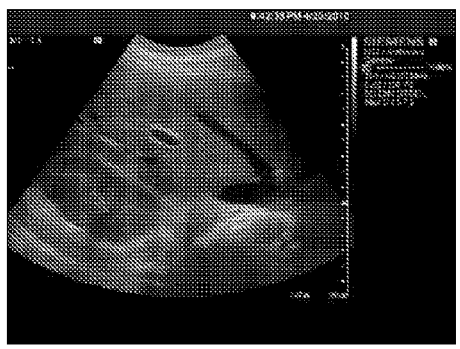
(a)
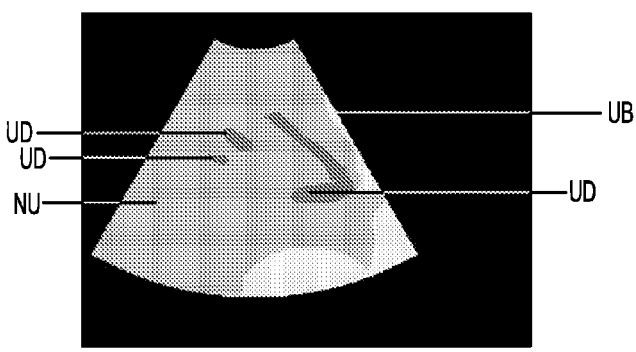
(b)
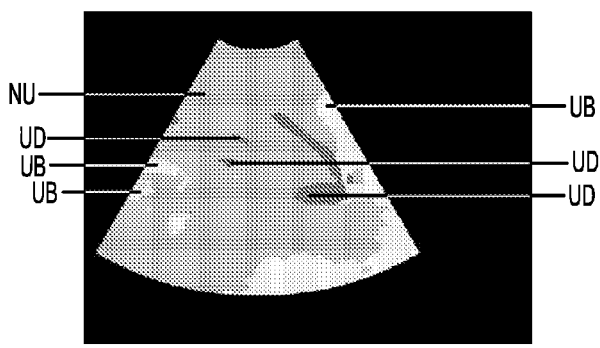
(c)
| Auto/GT | Label 1 | Label 2 | Label 3 |
|---|---|---|---|
| Label 1 | 84.91% | 9.72% | 6.69% |
| Label 2 | 0.02% | 69.48% | 0.48% |
| Label 3 | 15.08% | 20.80% | 92.83% |
| All labels | 100.00% | 100.00% | 100.00% |
FIG. 20: A kidney image used for training

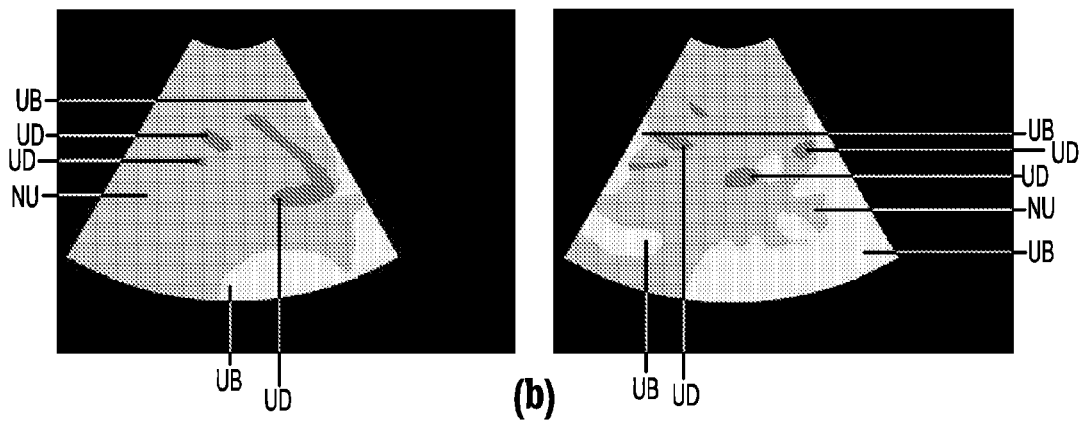
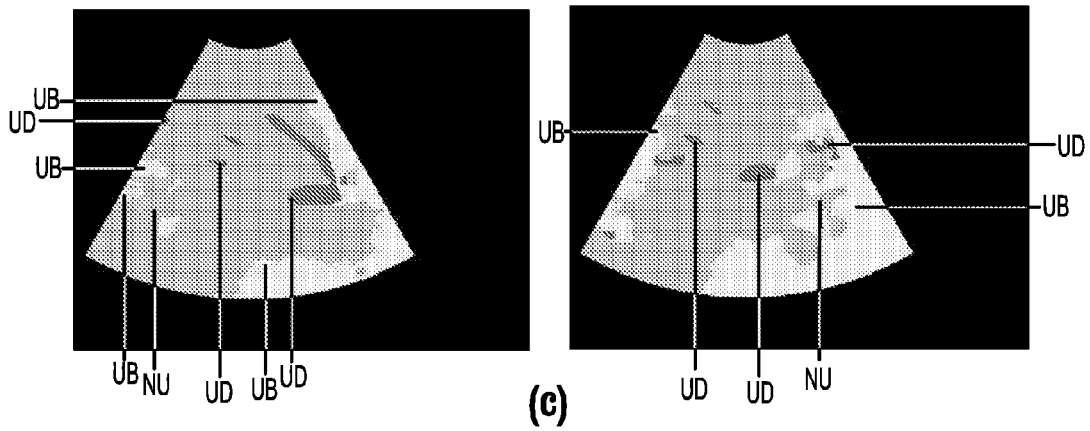
| Auto/GT | Label 1 | Label 2 | Label 3 |
|---|---|---|---|
| Label 1 | 86.47% | 2.96% | 13.92% |
| Label 2 | 0.72% | 67.02% | 0.82% |
| Label 3 | 12.81% | 30.02% | 85.26% |
| All labels | 100.00% | 100.00% | 100.00% |
| Auto/GT | Label 1 | Label 2 | Label 3 |
|---|---|---|---|
| Label 1 | 82.22% | 9.47% | 5.79% |
| Label 2 | 0.95% | 62.12% | 0.68% |
| Label 3 | 16.83% | 28.41% | 93.53% |
| All labels | 100.00% | 100.00% | 100.00% |
FIG. 21: A kidney

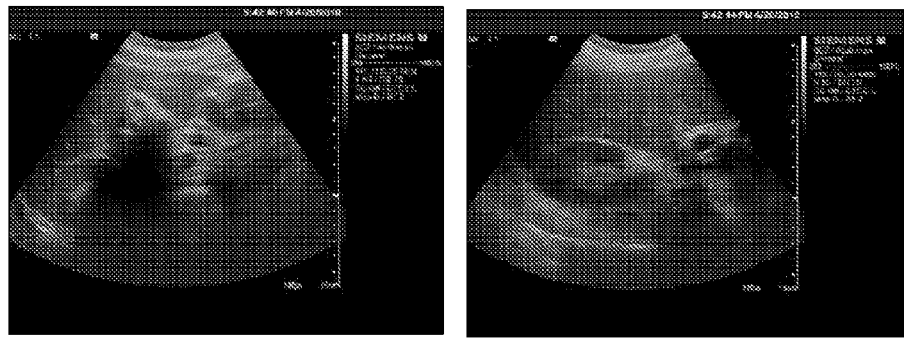
(a)
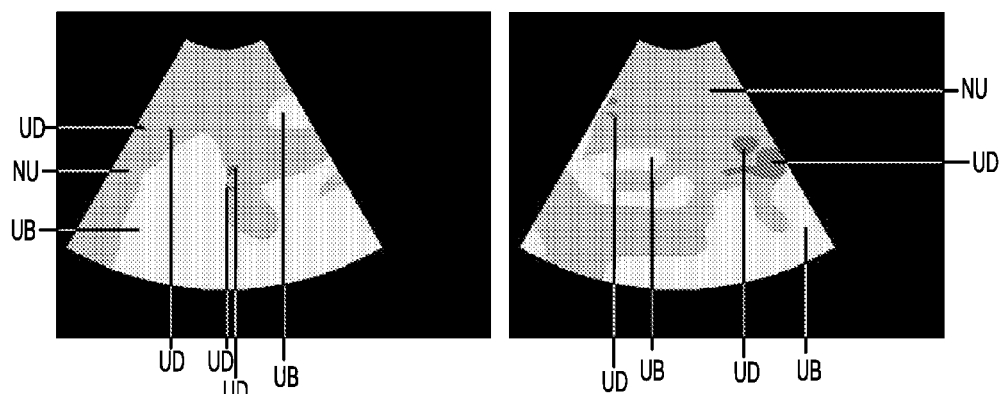
(b)
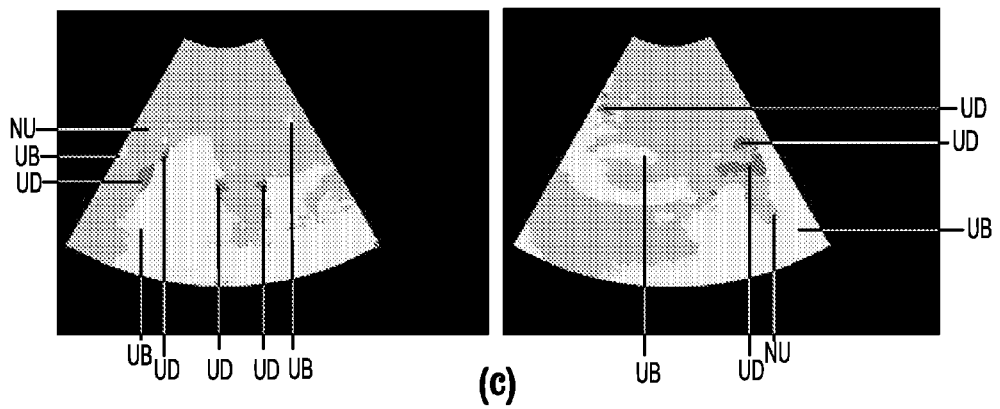
(c)
| Auto/GT | Label 1 | Label 2 | Label 3 |
|---|---|---|---|
| Label 1 | 85.23% | 11.76% | 3.03% |
| Label 2 | 2.02% | 5.53% | 0.39% |
| Label 3 | 12.74% | 82.71% | 96.58% |
| All labels | 100.00% | 100.00% | 100.00% |
| Auto/GT | Label 1 | Label 2 | Label 3 |
|---|---|---|---|
| Label 1 | 89.87% | 32.26% | 9.21% |
| Label 2 | 0.28% | 49.42% | 0.81% |
| Label 3 | 9.85% | 18.32% | 89.98% |
| All labels | 100.00% | 100.00% | 100.00% |
FIG. 22: A kidney

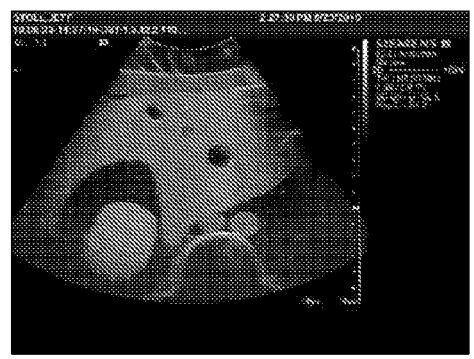
(a)
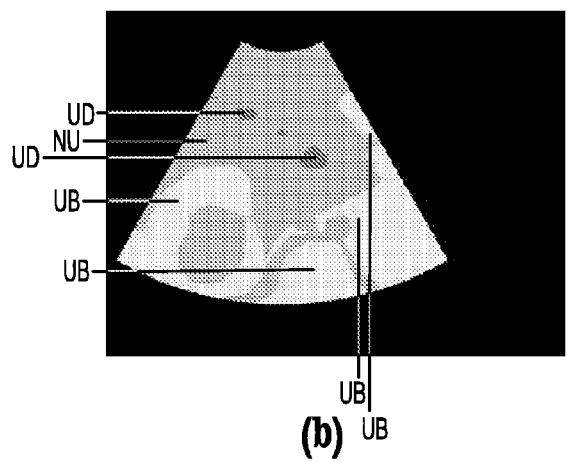
(b)
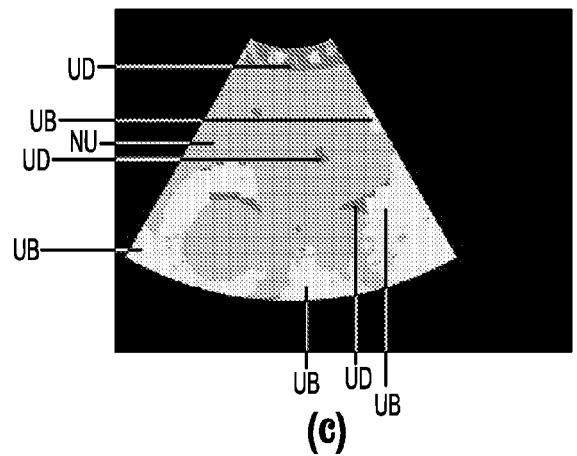
(c)
| Auto/GT | Label 1 | Label 2 | Label 3 |
|---|---|---|---|
| Label 1 | 70.16% | 0.32% | 1.24% |
| Label 2 | 3.98% | 36.05% | 4.93% |
| Label 3 | 25.86% | 63.63% | 93.83% |
| All labels | 100.00% | 100.00% | 100.00% |
FIG. 23: A phantom used for training

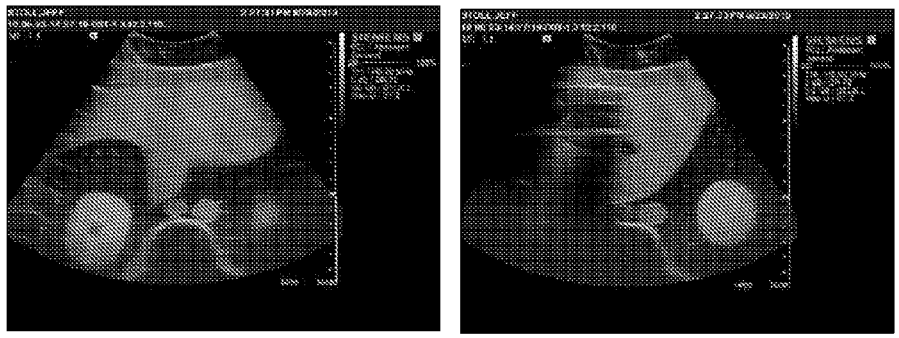
(a)
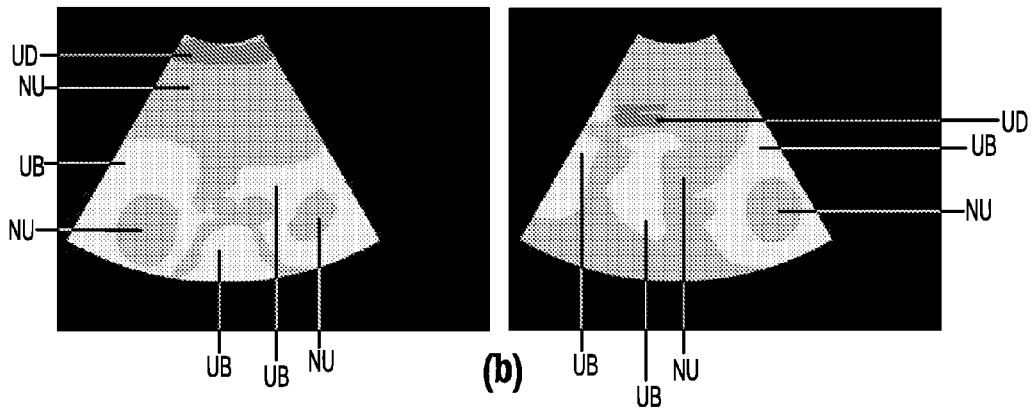
(b)
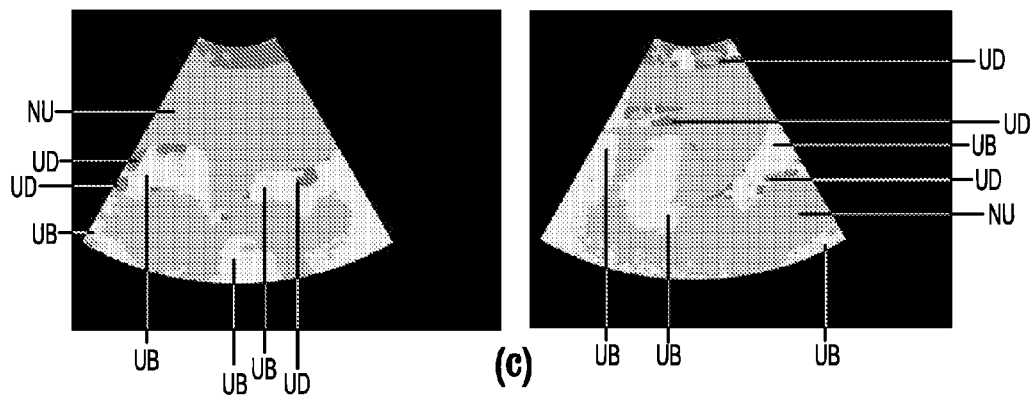
(c)
| Auto/GT | Label 1 | Label 2 | Label 3 |
|---|---|---|---|
| Label 1 | 62.41% | 0.07% | 0.95% |
| Label 2 | 5.55% | 75.44% | 0.72% |
| Label 3 | 32.04% | 24.49% | 98.33% |
| All labels | 100.00% | 100.00% | 100.00% |
| Auto/GT | Label 1 | Label 2 | Label 3 |
|---|---|---|---|
| Label 1 | 64.58% | 21.56% | 13.01% |
| Label 2 | 2.98% | 50.05% | 3.65% |
| Label 3 | 32.44% | 28.38% | 83.34% |
| All labels | 100.00% | 100.00% | 100.00% |
FIG. 24: A phantom

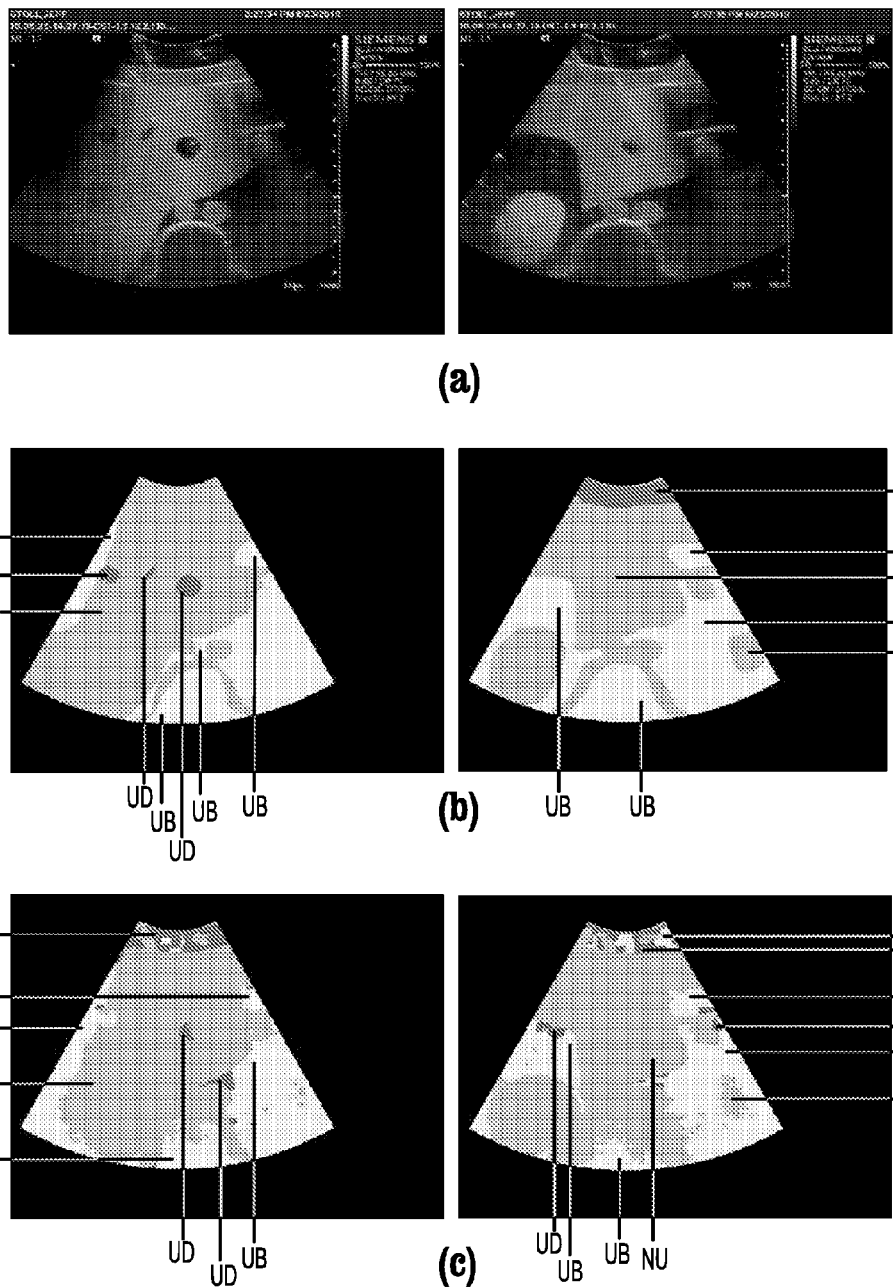
FIG. 25: A phantom

SYSTEM AND METHOD FOR DETECTION OF ACOUSTIC SHADOWS AND AUTOMATIC ASSESSMENT OF IMAGE USABILITY IN 3D ULTRASOUND IMAGES

CROSS REFERENCE TO RELATED UNITED STATES APPLICATIONS

This application claims priority from "Detection of Acoustic Shadows in 3D Ultrasound Images For Registration", U.S. Provisional Application No. 61/250,061 of Hong, et al., filed Oct. 9, 2009, and "Automatic assessment of ultrasound image usability" of Stoll, et al., filed Jul. 30, 2010, the contents of both of which are herein incorporated by reference in their entireties.

TECHNICAL FIELD

This disclosure is directed to detecting acoustic shadows and evaluating image quality in 3D ultrasound images.

DISCUSSION OF THE RELATED ART

Ultrasound is the most commonly used form of medical imaging. It offers clinicians the ability to view body structures quickly, easily, relatively in expensively and without radiation. Among its many uses are evaluating trauma, monitoring fetal development, identification and characterization of lesions, and guiding interventions. Nevertheless, skill and training are required to acquire high-quality images. Image acquisition is sensitive to skin contact and transducer orientation and requires both time and technical skill to be done properly. Images commonly suffer degradation from acoustic shadows and signal attenuation, which present as regions of low signal intensity masking anatomical details and making the images partly or totally unusable. A variety of factors, including occluding anatomy, poor contact, and signal degradation can obscure anatomical details, leading to regions of images that are clinically useless. When an ultrasound scan is performed, a user attempts to avoid such negative factors to achieve the most useful images possible. However, in an attempt to increase efficiency and consistency, automatic systems are increasingly being used, such as to acquire 3-dimensional scans and perform image analysis. As ultrasound image acquisition and analysis becomes increasingly automated, it is beneficial to also automate the estimation of image quality.

Unusable regions are mostly composed of wide shadowed areas which are characterized by a significant drop of the intensity in the resulting image. Intensity, however, is not the only factor that has to be taken into account. Vessels, for instance, also appear dark in the B-scan but still have to be considered as useful information since they are part of the general anatomy and are thus very important for medical diagnosis. Therefore, the usability of a region comes to depend on several factors, only one of which is the local intensity. A representative B-mode ultrasound image is shown in FIG. 1(a). FIG. 1(b) shows a ground-truth manual segmentation of the image in FIG. 1(a) into unusable regions 11, vessels 12, and usable tissue 13.

An ultrasound image is acquired by applying a hand-held probe, called a transducer, on a patient. When the sound wave impacts an interface, it is partly reflected, transmitted, absorbed and/or diffused. Some of these phenomena are determined by the variation of the acoustic impedance at the interface. Due to these multiple reflections, the transducer receives a series of echoes. When an echo is received, the transducer measures the time elapsed and the strength of the echo and infers information about the density of the scanned region. The image is produced by retrieving the density distribution from echoes analyzed in each direction.

Different modes are used in medical imaging, depending on how the sound waves are emitted. These modes include:
- A-mode: It is the simplest type of ultrasound. A single transducer scans a line through the body with the echoes plotted on screen as a function of depth.
- B-mode: In B-mode ultrasound, a linear array of transducers simultaneously scans a plane through the body that can be viewed as a 2D image on screen.
- M-mode: M-mode is used to record the amplitude and the rate of motion of moving objects along a single line.
- Doppler-mode: This mode makes use of the Doppler effect in measuring and visualizing blood flow.

The present disclosure is directed to B-modes images. FIG. 2(a) depicts a B-mode transducer. When a scan is performed, a series of signals are emitted at the same time in the plane of the probe. The sound waves diverge from the source so that a large plane of the body can be viewed. This is the reason why the window in which the content is displayed is a portion of disk. FIG. 2(b) displays lines 21 that indicate the direction of the scan lines. The sound waves propagate from top to bottom, which means that the lower a region is in FIG. 2(b), the deeper it is within the tissue.

Acoustic shadows are regions of low signal intensity in the resulting image. Acoustic shadowing occurs when the wave has been totally reflected and no signal has been transmitted. This typically occurs at the tissue/air interface when the transducer is not properly placed, or at the tissue/bone interface. No signal penetrates the region located beyond the interface which results in occluded regions in the image. But interfaces with high variation in acoustic impedance are not the only causes of shadows. Tumors, which generally have high density, also produce shadows.

In an image that does not contain naturally dark structures, shadow detection can be achieved by analyzing the amount of acoustic energy at each location. But it becomes a very different challenge when an image contains anatomical structures that appear dark in B-scans. This is typically the case when vessels are encountered. Indeed, the tissue/vessel interface presents a high variation in acoustic impedance that reflects most of the energy when the sound meets a vessel. In terms of intensity, vessels and shadows may thus look alike in the resulting image. But whereas one is part of the anatomy, the other is an occlusion of the anatomy. The task is even more challenging when vessels appear between shadows, as shown in FIG. 3(c).

FIGS. 3(a)-(d) shows two different B-scans on the left and the corresponding expected structures on the right. FIG. 3(a) is a scan of a liver. Vessels and shadows are delineated in FIG. 3(b). It can be assumed that the shadow 31 located on the left is due to a misplacement of the transducer since there seems to be no signal in the whole direction. The other shadows are more probably caused by a tissue occlusion. FIG. 3(c) is a scan of ribs. The ribs 32 are located on the top of the image and prevent the ultrasound waves from propagating through the tissue, which explains the presence of large dark regions below them. This is a typical tissue/bone interface. Some vessels are still visible between the shadows. The corresponding segmentation is shown in FIG. 3(d). The vessel/shadow distinction is more challenging given that they are not clearly separated.

The presence of an acoustic shadow provides useful information for diagnosis applications, such as lesion detection (e.g. gallstones and calcifications) and structure (e.g. bone structure) detection. However, it also creates challenges for other applications, such as ultrasound image registration and segmentation of lesions or structures.

A few methods have been reported for acoustic shadow detection, which can be roughly categorized into two groups:

(1) Texture classification based methods treat the task as a texture classification task, by applying a classification scheme based on certain extracted features. One method detects posterior lesion shadowing using Adaboost on a number of intensity based and texture based features, including intensity statistics, Haralick features, and Gabor filters. Another method uses a skewness map of a region of interest to differentiate acoustic shadowing from lesions.

(2) Geometric based methods perform classification on line scans. One method correlates the intensity profile of a line scan to an ideal profile line scan model (an exponential function) to determine the existence of acoustic shadowing. Another method first searches along a line scan line to identify breaks using an entropy type of feature and then classifies pixels on the line scan after the breaks using a threshold algorithm based on image intensity properties. Typically, a post-processing step is applied to smooth out the detection results.

Texture classification based methods have been developed for identifying lesions and/or abnormalities. A challenge in applying these methods to acoustic shadow detection is that these methods generally ignore the basic geometric property of acoustic shadow: that the acoustic shadow exists as regions with constraint configurations. On the other hand, geometric based methods explicitly use the geometric region property, which represents a more promising approach. However, geometric based methods do not take full advantage of the texture properties and the configuration information of the regions.

SUMMARY OF THE INVENTION

Exemplary embodiments of the invention as described herein generally include methods and systems for assessing the usability of B-mode ultrasound images. An algorithm according to an embodiment of the invention can operate completely automatically for arbitrary images, and makes no assumption about the anatomy in view or about shapes present in the image, and is executed before identification of image content. Taking an ultrasound image frame as input, an algorithm according to an embodiment of the invention can classify regions of the image into one of two groups: usable, i.e., likely to contain usable information, and unusable, i.e., likely to contain no significant information. The criteria for usability are defined through example by manual annotation on training images.

An algorithm according to an embodiment of the invention includes two steps. First, the image is classified into bright areas, likely to have image content, and dark areas, likely to have no content. Second, the dark areas are classified into unusable sub-areas, i.e., due to shadowing and/or signal loss, and usable sub-areas, i.e., anatomically accurate dark regions, such as with a blood vessel. The classification considers several factors, including statistical information, gradient intensity and geometric properties such as shape and relative position. Relative weighting of factors was obtained by training a Support Vector Machine (SVM).

Further embodiments of the invention as described herein generally include methods and systems for detecting acoustic shadows which can label acoustic shadow regions produced by high acoustic impedance structures in a 3D ultrasound image which uses both geometric features and texture features. An algorithm according to an embodiment of the invention operates in a two stage hypothesis/verification approach. In a hypothesis stage, candidate of suspicious acoustic regions are generated from a filtered image obtained by emphasizing abrupt intensity changes using some simple geometric constraints. In a verification stage, the generated candidate regions are evaluated using both texture and geometric properties to obtain an assessment.

Classification results for both human and phantom images are presented and compared to manual classifications. An algorithm according to an embodiment of the invention achieved 95% sensitivity in some cases, 91% sensitivity on average, and 91% specificity for usable regions of human scans. All results were obtained using a linear SVM kernel, which is the simplest one, but they should be even better with complex kernels since they allow a more accurate separation of the feature space.

Example applications of this algorithm could include improved compounding of free-hand 3D ultrasound volumes by eliminating unusable data and improved automatic feature detection by limiting detection to only usable areas.

According to an aspect of the invention, there is provided a method for automatically assessing medical ultrasound (US) image usability, including extracting one or more features from at least one part of a medical ultrasound image, calculating for each feature a feature score for each pixel of the at least one part of the ultrasound image, and classifying one or more image pixels of the at least one part as either usable or unusable, based on a combination of feature scores for each pixel, where usable pixels have intensity values substantially representative of one or more anatomical structures.

According to a further aspect of the invention, extracting one or more features from the at least one part of the ultrasound image includes labeling each pixel in the at least one part with a label that is inversely proportional to the size of the region to which it belongs, to calculate a dark regions score for each pixel, scanning the at least one part of the image in each radial direction to measure a length of the at least one part from beginning to end, and assigning a grayscale value to each pixel indicating the length of the at least one part to which the pixel belongs, to calculate a radial extent score for each pixel, calculating a maximum edge score by detecting edges in the at least one part of the image and assigning each pixel in the at least one part a maximum gradient of the at least one part, forming for each pixel in the at least one part a vector in a feature space defined by its dark regions score, radial extent score, and maximum edge score, and classifying each pixel in the at least one part of the image as either a bright usable pixel, a dark usable pixel, or a dark-unusable pixel based on its feature vector, where a usable region includes the bright usable pixels and the dark usable pixels, and a unusable region contains dark unusable pixels.

According to a further aspect of the invention, the method includes segmenting the image into bright and dark regions based on Otsu's criteria.

According to a further aspect of the invention, the method includes calculating a local intensity score and a local variance score for each pixel in the at least one part, where the Local Intensity is an average of the local intensity, and the Local Variance is its variance, and incorporating the local intensity score and the local variance score as additional dimensions in the feature space.

According to a further aspect of the invention, edges are detected using a Sobel filter on the image.

According to a further aspect of the invention, the method includes calculating a mean edge score by assigning each pixel in the at least one part the mean gradient of the at least one part, and incorporating the mean edge score as an additional dimension in the feature space.

According to a further aspect of the invention, calculating a maximum edge score comprises calculating for each pixel in a bright region a gradient intensity for that pixel.

According to a further aspect of the invention, the method includes training a 3-class classifier on pixels of the at least one part of the image in a feature space defined by the feature scores for each feature that can classify a pixel as a bright usable pixel, a dark usable pixel, or a dark-unusable pixel, where the usable pixels include the bright usable pixels and the dark-usable pixels.

According to a further aspect of the invention, training a 3-class classifier comprises training a binary classifier to determine whether or not a pixel is a bright pixel or a dark pixel, and training a binary classifier to determine whether the dark pixel is a dark-usable pixel or a dark-unusable pixel.

According to a further aspect of the invention, the binary classifier is a support vector machine.

According to another aspect of the invention, there is provided a program storage device readable by a computer, tangibly embodying a program of instructions executable by the computer to perform the method steps for automatically assessing medical ultrasound (US) image usability.

BRIEF DESCRIPTION OF THE DRAWINGS

FIGS. 8(a)-(f) illustrate the Maximum Edge Score and the Mean Edge Score for two different B-scans, according to an embodiment of the invention.

FIGS. 13(a)-(d) are tables of results for human scans and for phantom scans, according to an embodiment of the invention.

FIGS. 14 to 25 depict results for 20 remaining images, according to embodiments of the invention.

DETAILED DESCRIPTION OF EXEMPLARY EMBODIMENTS

Figure 1:
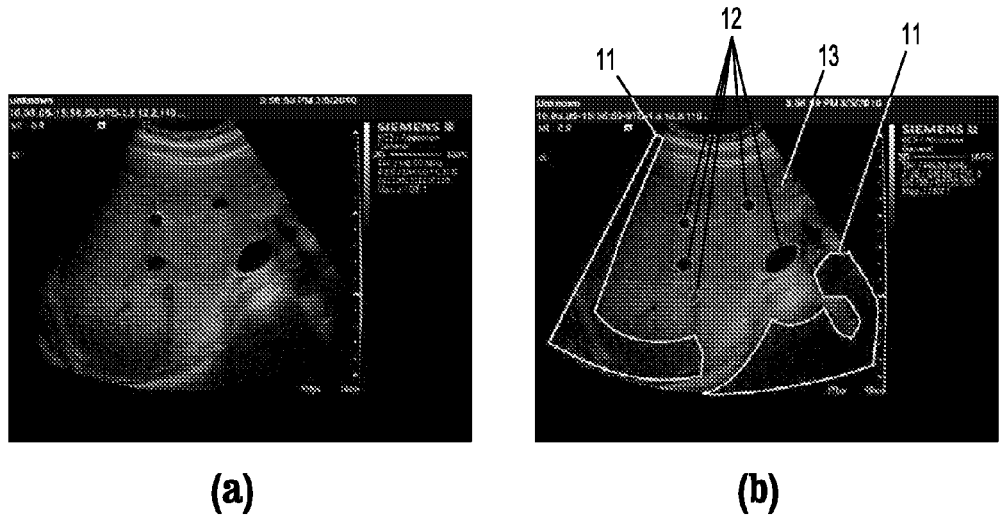
FIGS. 1(a)-(b) depicts a representative B-mode ultrasound image and a ground-truth manual segmentation of the image, according to an embodiment of the invention.
Figure 2:
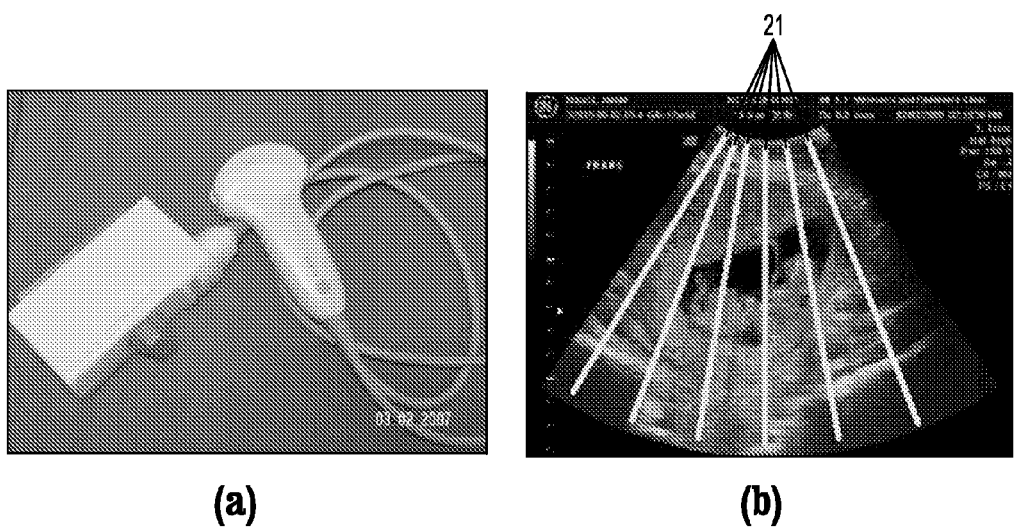
FIGS. 2(a)-(b) depict a B-mode transducer, according to an embodiment of the invention.
Figure 3:
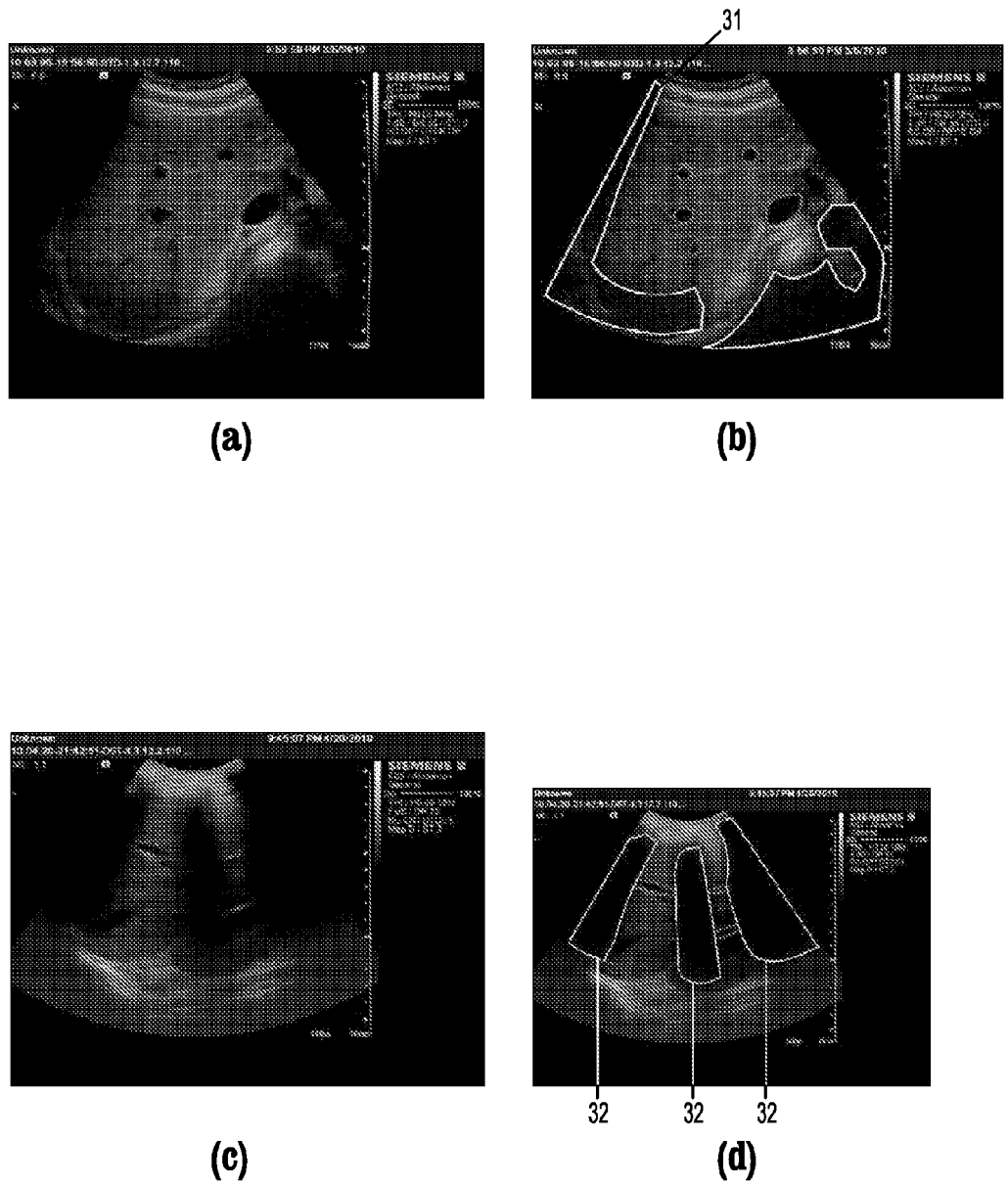
FIGS. 3(a)-(d) shows two different B-scans on the left and the corresponding expected structures on the right, according to an embodiment of the invention.

Exemplary embodiments of the invention as described herein generally include systems and methods for detecting acoustic shadows and evaluating image quality in 3D ultrasound images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The teens "digital" and "digitized" as used herein will refer to images or volumes, as appropriate, in a digital or digitized format acquired via a digital acquisition system or via conversion from an analog image.

An algorithm according to an embodiment of the invention for automatic assessment of image quality performs an automated classification based on features that are indicative of whether a local region of an image contains usable information. Given the set of features, existing machine learning techniques can be used to find a combination of features that can classify regions of an image as being either usable or unusable.

A challenge according to an embodiment of the invention is to identify the best feature set which can distinguish between usable and unusable image regions. A usable region contains pixels whose intensity values are substantially representative of one or more anatomical structure. Note that a region according to an embodiment of the invention can be as small as one pixel. To this end, three image properties insensitive to view angle and body region have been identified. These properties are as follows.

Vessel size is limited by its thickness whereas a shadow is potentially unlimited in space. Provided that shadows and vessels are well separated on the image, one can distinguish them by examining their relative size or length.

Shadows and vessels differ based on the boundary sharpness. Away from the transducer the appearance of a shadow usually exhibits a smooth continuous drop in the intensity. Vessels, instead, generally present easily distinguishable contours. Analysis of the gradient intensity around the dark regions can thus be useful to distinguish vessels from shadows.

B-mode images are constructed from successive scan lines. Thus, shadows boundaries are collinear with lines that compose the scan.

According to an embodiment of the invention, features selected to take advantage of these observations are:

(1) Dark Regions; (2) Dark Regions Size; (3) Radial Extent; (4) Maximum Edge Score; (5) Mean Edge Score; (6) Local Intensity; and (7) Local Variance.

Dark Regions

Figure 4:
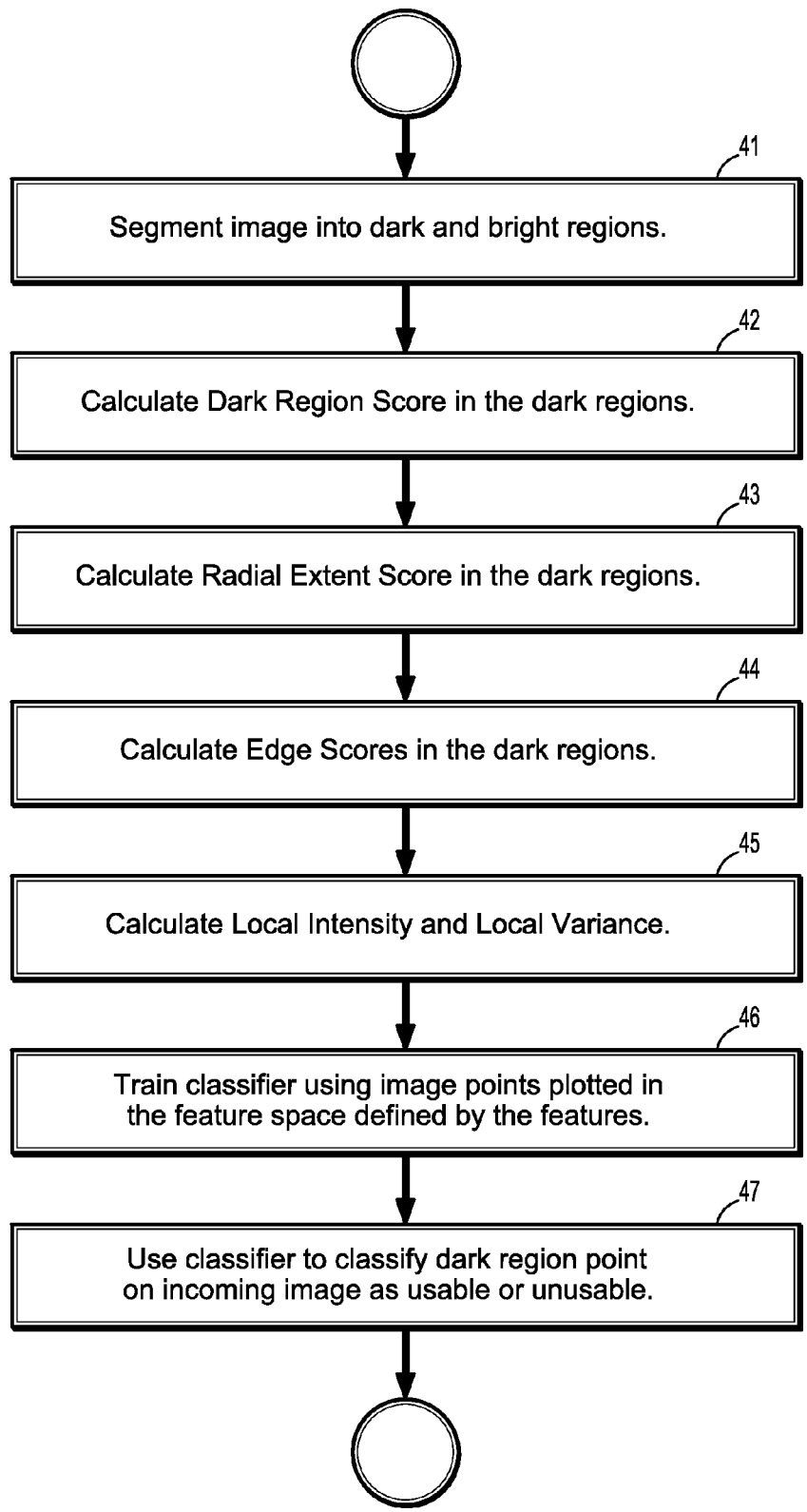
FIG. 4 is a flow chart for a method of assessing ultrasound (US) image usability, according to an embodiment of the invention.

FIG. 4 is a flowchart of a method for classifying dark image regions as usable or unusable, according to an embodiment of the invention. Given an ultrasound image, a method begins at step 41 by segmenting the image into bright and dark regions, so that a dark region may be extracted. Bright regions always contain useful content, it is mostly within the dark regions that pixels have to be sorted. Dark regions can be useful, i.e., part of the anatomy, or non-useful, i.e., acoustic shadows or loss of signal. Dark regions may be extracted by converting the frame into a binary image based on the intensity. Before thresholding the image, mean filter with a square kernel is applied to render the extracted regions more compactly. The threshold level may be automatically determined by maximizing the inter-class variability. An exemplary, non-limiting algorithm for thresholding is Otsu's algorithm. Even if this feature is the basis for the calculation of other features, it is still but one criterion among several others in the final decision. Thus, to a pixel may appear in a bright region, but still be labeled as a shadow by the classifier.

Figure 5:
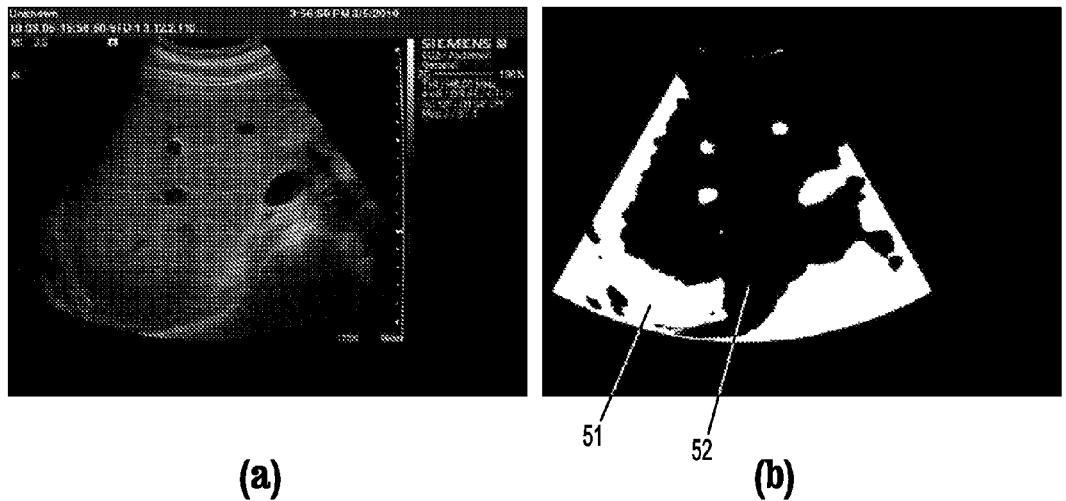
FIGS. 5(a)-(b) shows the segmentation of a B-scan image after the smoothing filter has been applied, according to an embodiment of the invention.

FIGS. 5(a)-(b) shows the segmentation of a B-scan image after the smoothing filter has been applied. The original B-scan image is shown in FIG. 5(a), and the extracted regions are represented in white on a black background in FIG. 5(b).

Having extracted the dark regions, four remaining features can be computed for each pixel of the original image. These features are referred to hereinbelow as Dark Region Size, Features Length, Maximum Edge Score, and Mean Edge Score, respectively.

Dark Region Size

Figure 6:
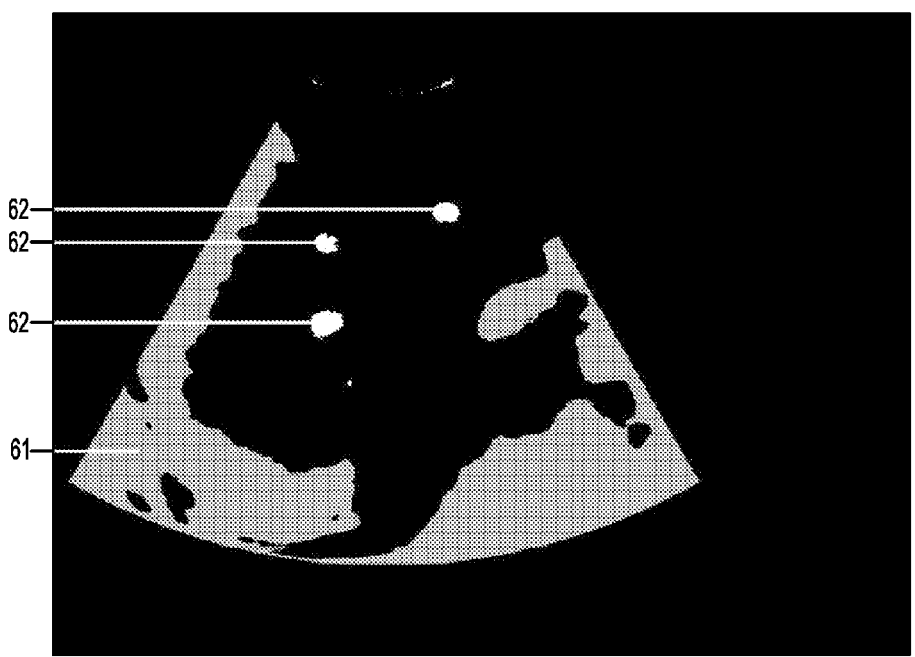
FIG. 6 depicts the Dark Region Size score for the image of FIG. 5(b), according to an embodiment of the invention.

Shadows usually result from either a loss of contact between the transducer and the skin or from the presence of an opaque artifact in the ultrasound field. As a result, it is unlikely that usable information can appear below a shadow. Conversely, a vessel is usually a confined shape, although its size is variable. Consideration of the size of a dark connected region can thus be indicative of the likelihood of a shape being a vessel. Thus, referring to FIG. 4, each extracted dark region can be labeled at step 42 with a decreasing function of its size, and the Dark Region Score feature for each pixel value can be defined as being inversely proportional to the size of the region to which it belongs. FIG. 6 depicts the Dark Region Size score for the image of FIG. 5(b). Note that region 61 is grey while regions 62 are white, indicative of a higher score for a smaller region 62 than for the larger region 61.

However, this feature is insufficiently accurate since it cannot separate pixels from the same connected region. Indeed, pixels may belong to the same connected region but to different classes, which can happens when a there is a loss of contact in a direction where a vessel is present. The Radial Extent Score can address this issue.

Radial Extent

Figure 7:
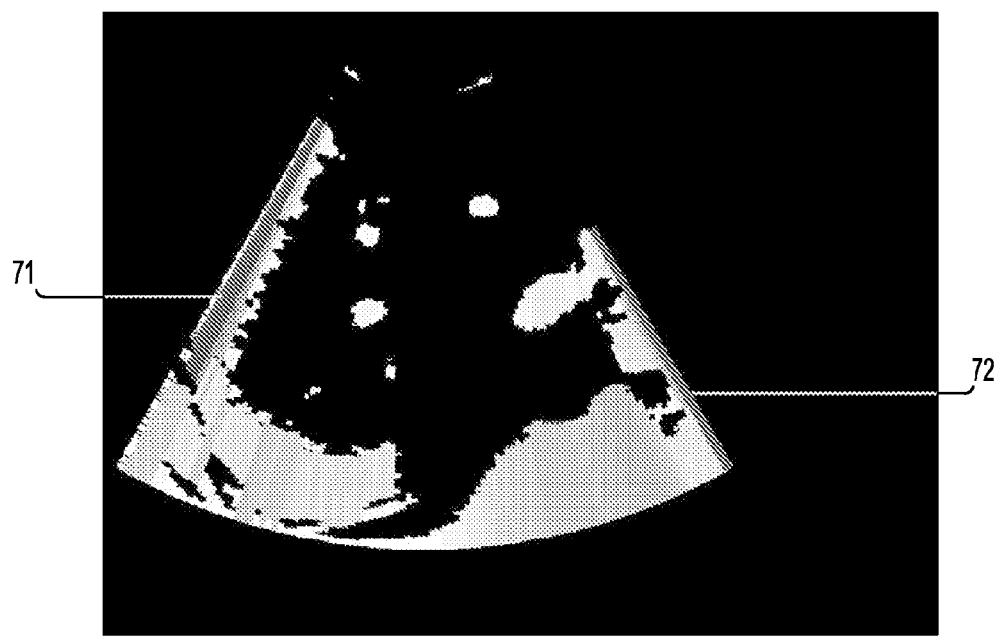
FIG. 7 depicts the Radial Extent score for the image of FIG. 5(b), according to an embodiment of the invention.

For this feature, referring again to FIG. 4, the image is scanned at step 43 in each radial direction and the length of the crossed dark region from beginning to end is measured. A grayscale value is then assigned to each pixel indicating the length of the scan line to which it belongs. The brightness of the display is defined to be inversely proportional to the length of the crossed scan line. Since a vessel is generally relatively compact, this score is an indicator of the likelihood that a pixel belongs to a vessel. Note that computing the Radial Extent is slower than computing the Dark Region Size since each direction needs to be scanned. FIG. 7 depicts the Radial Extent score for the image of FIG. 5(b), exhibiting different grey levels for different radial scan lines. The darker lines 71, 72 are indicative of longer sc lines within a dark region.

Maximum Edge and Mean Edge Scores

Another feature that can be used for the final decision is the local gradient information of the image. Even if both vessels and shadows have dark pixels, their boundaries are not alike. A shadow usually exhibits a smooth loss of intensity whereas a vessel exhibits a sudden intensity drop due to a sudden density transition in the limb. Referring to FIG. 4, an edge score is computed at step 44, and a computation according to an embodiment of the invention may be performed in two steps. The edges are first extracted by applying a filter to the image, and are then combined with the dark regions to obtain the 'Maximum Edge Score' and the 'Mean Edge Score'. An exemplary, non-limiting edge detection filter is a Sobel filter. This can be performed as follows. For the Maximum Edge Score (respectively Mean Edge Score), each pixel in a scan line in the dark regions is assigned the maximum gradient (respectively mean gradient) seen in the dark region. For pixels in the bright regions, the gradient intensity is assigned.

FIGS. 8(a)-(f) illustrate the Maximum Edge Score and the Mean Edge Score for two different B-scans. The left column, FIGS. 8(a), (c), and (e), corresponds to a liver scan, and the right column, FIGS. 8(b), (d), and (f), corresponds to a rib scan. The second row images are the Maximum Edge Score images, in the third row images are the Mean Edge Score images. Note that the average gradient penalizes shapes with sharp contours but a large extent, as can be seen in FIG. 8(f).

It may be seen that, due to a surrounding high gradient, vessels present a high edge score which makes them likely to be classified as useful information. Each one of these four features can be seen as an indicator of how likely a shape is to be a vessel.

Local Intensity and Local Variance

Figure 9:
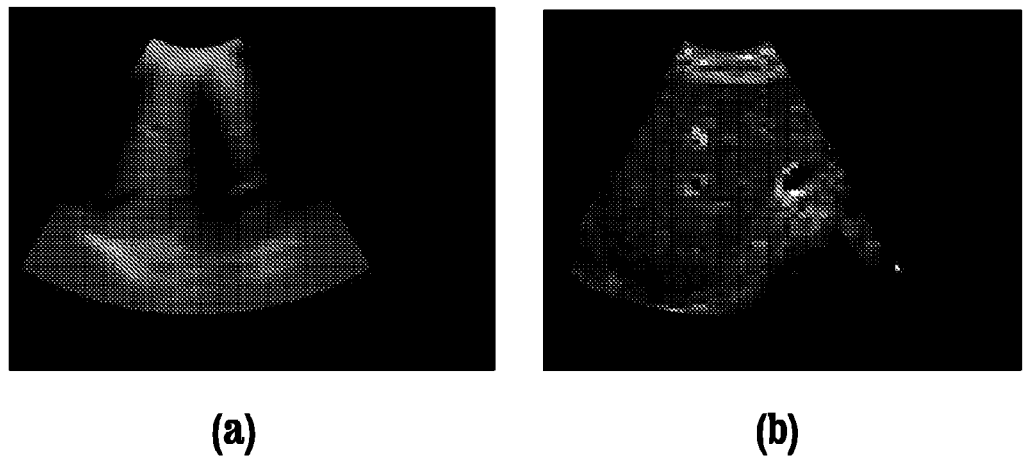
FIGS. 9(a)-(b) illustrate a Local Intensity and a Local Variance, according to an embodiment of the invention.

Referring again to FIG. 4, at step 45, a local intensity score and a local variance score are calculated. The local intensity is an average of the local intensity, and the local variance is its variance. FIG. 9(a) illustrates a Local Intensity and FIG. 9(b) illustrates a Local Variance. Computing these feature helps take the information around a pixel into consideration for the decision. Exemplary, non-limiting pixel regions for computing the local intensity score and local variance scores are 9×9, however, the sample size may be readjusted based on the resolution or noise properties of the image.

Representation in Feature Space

Once the above features have been calculated for a given image, each pixel of the original image can be described by a feature vector in the corresponding feature space.

The original image may be represented by a pair I=(C; g), where C is the 2-dimensional array of pixels that compose the mask of interest and g is the intensity of each pixel. If K represents the number of computed features, there will be K feature images $F_k=(C; f_k)$, for k=1, ..., K. Each pixel c□C may then be described by the K-dimensional vector $V(c)=\{f_k(c)\}_{1 \leq k \leq K}$ projected into the feature space.

When projected into the feature space, pixels of different classes in the image belong to different clusters in the feature space.

Figure 10:
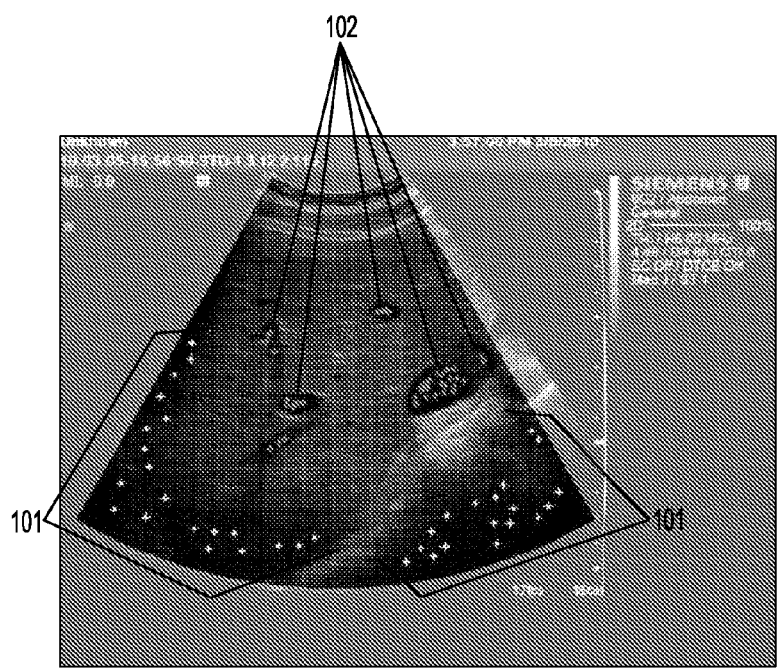
FIG. 10 shows an original grayscale image, with points manually selected to in the shadow area and points manually selected to be inside vessels, according to an embodiment of the invention.

FIG. 10 shows the original grayscale image, with 40 points 101 manually selected to in the shadow area and 40 points 102 manually selected to be inside vessels. All of these 80 points are then projected into the feature space. It is desired that the shadow points and the vessel points be located in different sub-areas of the feature space. To visualize the separation, the points are projected into a 3-dimensional space defined by the Dark Regions Size, Radial Extent, and Maximum Edge Score features.

Figure 11A:
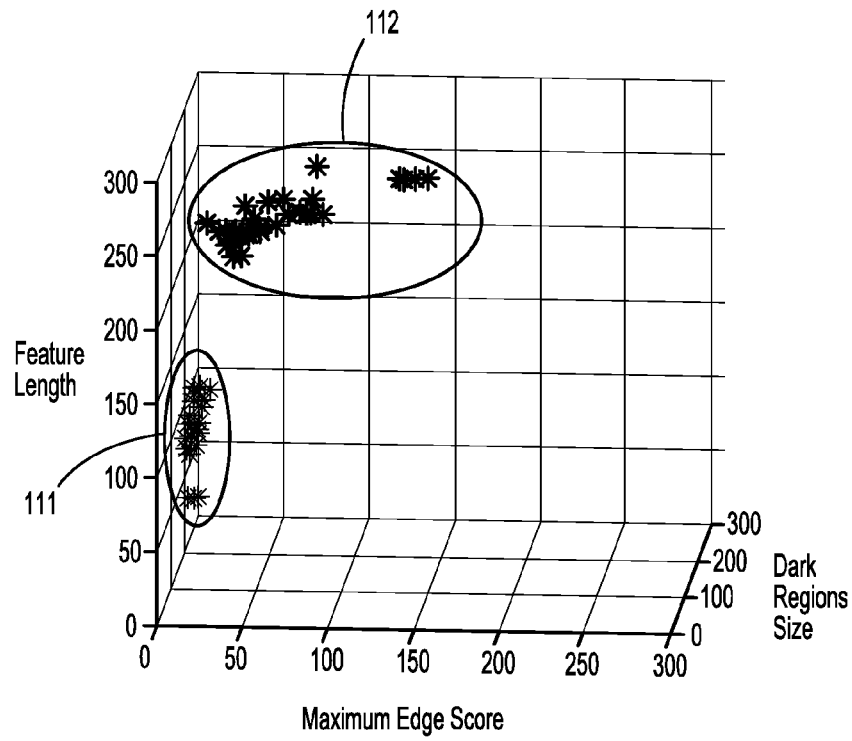
FIGS. 11(a)-(d) illustrates the points plotted in a 3-dimensional feature space y, according to an embodiment of the invention.
Figure 11B:
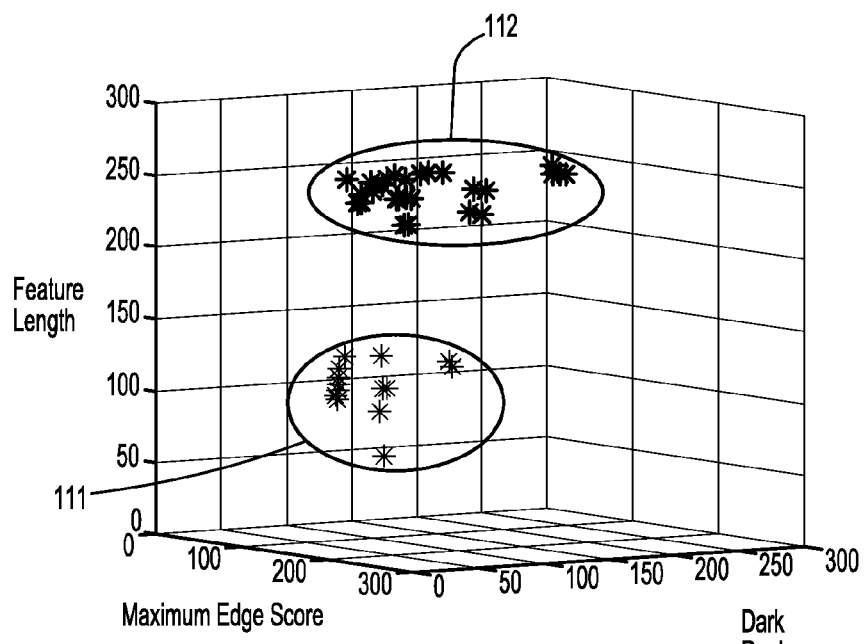
Figure 11C:
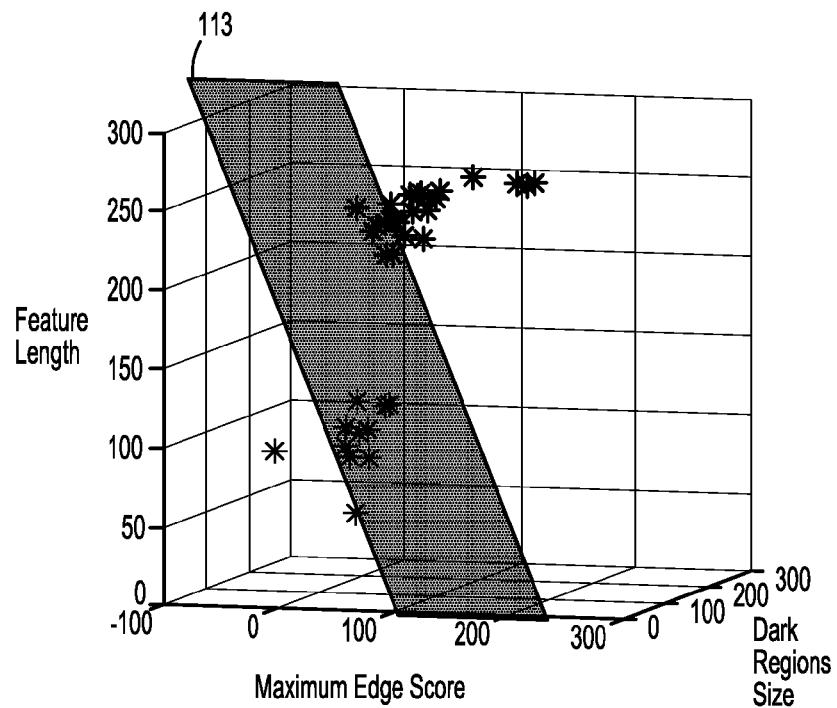
Figure 11D:
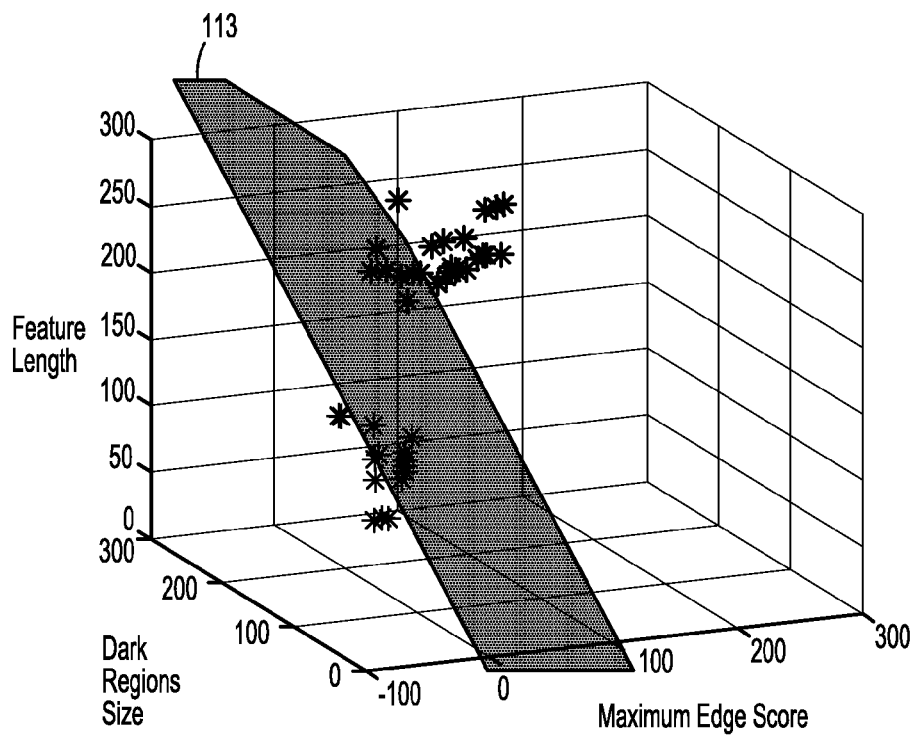

FIGS. 11(a)-(d) illustrates the points plotted in a 3-dimensional feature space. These figures show that points from different classes are readily distinguishable in the 3-dimensional space defined by the Dark Regions Size, Radial Extent, and Maximum Edge Score features. Indeed, as mentioned above, the circled points 112 present strong values for each one of the three coordinates, which make them easy to separate from the circled points 111. FIGS. 11(c) and 11(d) show a separating hyperplane 113 for point clusters in FIGS. 11(a) and 11(b), respectively.

Final Determination

Figures 12, 13:
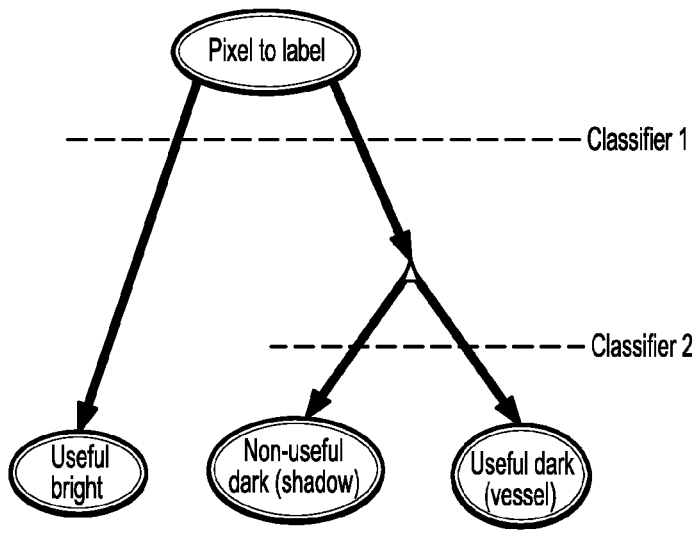
FIG. 12 shows how two binary classifiers may be combined to obtain a 3-class classifier, according to an embodiment of the invention.

Using separating surfaces between sub-areas of the features space helps to automatically classify the pixels regions. A 3-class classifier can be built at step 46 of FIG. 4 by combining two classifiers. A first classifier is used to determine whether or not the pixel is a useful bright pixel. If not, a second classifier is used to determine whether the pixel is dark-usable, i.e. a vessel pixel, or dark-unusable, i.e., a shadow pixel. FIG. 12 shows how two binary classifiers may be combined to obtain a 3-class classifier.

The classifier segments the feature space into regions corresponding to the labels, such as "useful bright", "useful dark (vessel)", and "not-useful", where region boundaries are defined by hyperplanes. All pixels, which map to a particular region in feature space may be assigned the label of that region. In this way each pixel of the image is assigned a label.

Support Vector Machine

Each classifier may be trained using a Support Vector Machine (SVM). The Support Vector Machine (SVM) is a well-known machine learning technique that is extensively used for pattern recognition by sorting points into two classes, labeled −1 and +1, according to their spatial location in the feature space. This classification is performed by separating the space in which the points live into two sub-spaces. Every point that lives in one side of the separating hyper-surface will be assigned the label −1 and every point that lives in the other side will be labeled +1. Using an SVM requires splitting the space into sub-areas. This is called the training step, which comprises defining a number of points in each class as −1 and +1 in a training dataset. Having done so, the SVM computes the best separating surface among all the possible separating surfaces. Once the space is split, the machine can be used on new datasets at step 47 to automatically assign a label to any point. This is called the testing step. It may be assumed that the points live in the space $R^d$. A point is represented by $\{X, y\}$, $x \square R^d$, $y \square \{-1; +1\}$ The separating surface of a linear SVM is a hyperplane, which may be defined by its Cartesian equation $x \cdot w + b = 0$. Training a SVM thus comprises determining the vectors w and intercept point b. Given a test vector, the label is determined from $sgn(x \cdot w + b)$. Note that in many cases for linear SVMs, the sets may not be separable by a hyperplane. In that case, the constraints may be relaxed:

$$x_i \cdot w + b \geq +1 - \xi_i \text{ for } y_i = +1,$$

$$x_i \cdot w + b \leq -1 + \xi_i \text{ for } y_i = -1$$

$$\xi_i \geq 0, \forall i$$

Alternatively, non-linear SVMs may be defined in which the separating surface is not a linear function of the data.

Results

An algorithm according to an embodiment of the invention was tested on four ultrasound clips of varying length: 1 of a phantom and 3 of a human abdomen. In each training image, 500 points were randomly selected throughout the image to build the classifier using a linear kernel. With the phantom, 1 image was used for training and 5 for testing. With human data, 3 images were used for training and 15 for testing. Classifications obtained via an algorithm according to an embodiment of the invention were compared at the pixel level to manual segmentations image, denoted in tables by GT (ground FIGS. 13(a)-(d) are tables of results for human scans (top) and for phantom scans (bottom). Label 1 indicates shadows, 2 vessels and 3 bright areas. The right-side tables are obtained gathering labels 2 and 3 (the usable pixels) from the left-side tables.

Segmentations produced by an algorithm according to an embodiment of the invention were compared to segmentations manually defined by experts. For each label of the ground-truth images, the tables on the left indicate with which sensitivity the machine was able to assign the correct label.

FIGS. 14 to 25 depict results for 20 remaining images. In particular, FIGS. 14-16 depict a liver, FIGS. 17-19 depict ribs, FIGS. 20-22 depict a kidney, and FIGS. 23-25 depict a phantom. Those figures with only one column were used for training. Note that the table at the bottom is same as the left side tables in FIGS. 13(a) and (c). With regard to FIGS. 14-25(a)-(c), the top row (a) shows the image frame, the second row (b) shows a ground truth manual annotation, and the third row (c) shows the automatically generated classification. The same labels are used for FIGS. 14-25(a)-(c). In particular, the label "NU" indicates unusable parts of the image, the label "UB" indicates usable bright parts of the original image, and the label "UD" indicates usable but dark parts of the original image. Note that, to avoid undue clutter in the figures, only selected usable dark regions will be identified, since these regions tend to be scattered about the images. The tables at the bottom of each of FIGS. 14-25 have the same format and interpretation as the tables in FIGS. 13 (a) and (c).

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 26:
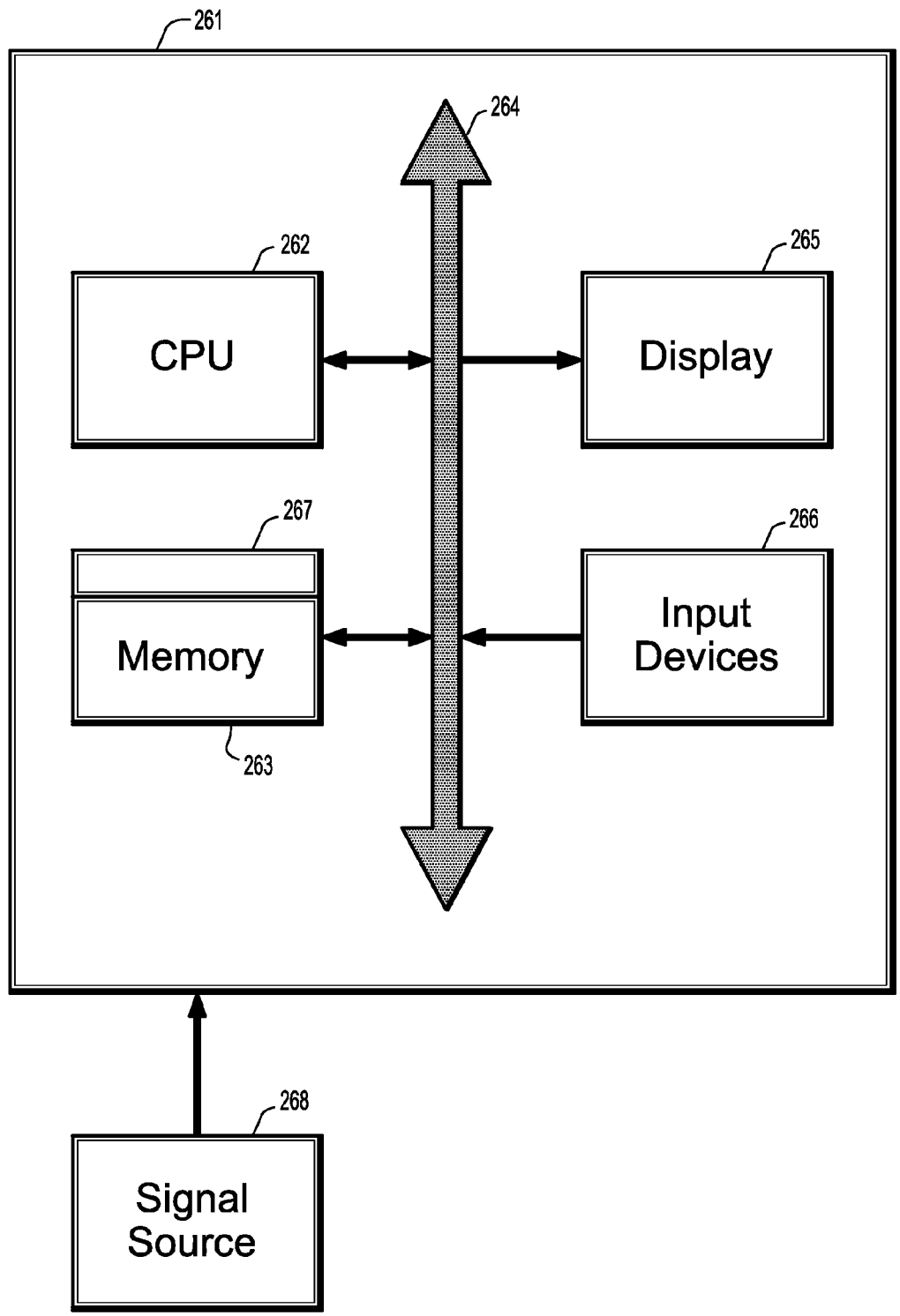
FIG. 26 is a block diagram of an exemplary computer system for implementing a method for detecting acoustic shadows and evaluating image quality in 3D ultrasound images, according to an embodiment of the invention.

FIG. 26 is a block diagram of an exemplary computer system for implementing a method for detecting acoustic shadows and evaluating image quality in 3D ultrasound images according to an embodiment of the invention. Referring now to FIG. 26, a computer system 261 for implementing the present invention can comprise, inter alia, a central processing unit (CPU) 262, a memory 263 and an input/output (I/O) interface 264. The computer system 261 is generally coupled through the I/O interface 264 to a display 265 and various input devices 266 such as a mouse and a keyboard. The support circuits can include circuits such as cache, power supplies, clock circuits, and a communication bus. The memory 263 can include random access memory (RAM), read only memory (ROM), disk drive, tape drive, etc., or a combinations thereof. The present invention can be implemented as a routine 267 that is stored in memory 263 and executed by the CPU 262 to process the signal from the signal source 268. As such, the computer system 261 is a general purpose computer system that becomes a specific purpose computer system when executing the routine 267 of the present invention.

The computer system 261 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method for automatically assessing medical ultrasound (US) image usability, the method comprising the steps of:
    extracting one or more features from at least one part of a medical ultrasound image;
    calculating for each feature a feature score for each pixel of said at least one part of said ultrasound image; and
    classifying one or more image pixels of said at least one part as either usable or unusable, based on a combination of feature scores for each pixel, wherein usable pixels have intensity values substantially representative of one or more anatomical structures.

2. The method of claim 1, wherein extracting one or more features from the at least one part of the ultrasound image comprises:
    labeling each pixel in the at least one part with a label that is inversely proportional to the size of the region to which it belongs, to calculate a dark regions score for each pixel;
    scanning the at least one part of the image in each radial direction to measure a length of the at least one part from beginning to end, and assigning a grayscale value to each pixel indicating said length of the at least one part to which said pixel belongs, to calculate a radial extent score for each pixel;
    calculating a maximum edge score by detecting edges in the at least one part of said image and assigning each pixel n the at least one part a maximum gradient of the at least one part;
    forming for each pixel in the at least one part a vector in a feature space defined by its dark regions score, radial extent score, and maximum edge score; and
    classifying each pixel in the at least one part of the image as either a bright usable pixel, a dark usable pixel, or a dark-unusable pixel based on its feature vector, wherein a usable region includes the bright usable pixels and the dark usable pixels, and a unusable region contains dark unusable pixels.

3. The method of claim 2, further comprising segmenting the image into bright and dark regions based on Otsu's criteria.

4. The method of claim 3, wherein calculating a maximum edge score comprises calculating for each pixel in a bright region a gradient intensity for that pixel.

5. The method of claim 2, further comprising calculating a local intensity score and a local variance score for each pixel in the at least one part, wherein the Local Intensity is an average of the local intensity, and the Local Variance is its variance, and incorporating said local intensity score and said local variance score as additional dimensions in said feature space.

6. The method of claim 2, wherein said edges are detected using a Sobel filter on the image.

7. The method of claim 2, further comprising calculating a mean edge score by assigning each pixel in the at least one part the mean gradient of the at least one part, and incorporating said mean edge score as an additional dimension in said feature space.

8. The method of claim 1, further comprising training a 3-class classifier on pixels of the at least one part of said image in a feature space defined by the feature scores for each feature that can classify a pixel as a bright usable pixel, a dark usable pixel, or a dark-unusable pixel, wherein the usable pixels include the bright usable pixels and the dark-usable pixels.

9. The method of claim 8, wherein training a 3-class classifier comprises training a binary classifier to determine whether or not a pixel is a bright pixel or a dark pixel, and training a binary classifier to determine whether the dark pixel is a dark-usable pixel or a dark-unusable pixel.

10. The method of claim 9, wherein said binary classifier is a support vector machine.

11. A method for automatically assessing medical ultrasound (US) image usability, the method comprising the steps of:
    segmenting a medical ultrasound image into bright and dark regions;
    labeling each pixel in the dark regions with a label that is inversely proportional to the size of the region to which it belongs, to calculate a dark regions score for each pixel;
    scanning the image in each radial direction to measure a length of each crossed dark region from beginning to end, and assigning a grayscale value to each pixel indicating said length of the dark region to which said pixel belongs, to calculate a radial extent score for each pixel;
    calculating a maximum edge score by detecting edges in said image and assigning each pixel in a dark region a maximum gradient of the dark region;
    forming for each pixel a vector in a feature space defined by its dark regions score, radial extent score, and maximum edge score; and
    training a 3-class classifier on pixels in said feature space that can classify a pixel as a bright usable pixel, a dark usable pixel, or a dark-unusable pixel.

12. The method of claim 11, further comprising applying the classifier to classify pixels on a new US image as either bright usable pixels, dark usable pixels, or dark-unusable pixels.

13. The method of claim 11, wherein training a 3-class classifier comprises training a binary classifier to determine whether or not a pixel is a useful bright pixel of a dark pixel, and training a binary classifier to determine whether the dark pixel is a dark-usable pixel or a dark-unusable pixel, wherein said binary classifier is a support vector machine.

14. A program storage device readable by a computer, tangibly embodying a program of instructions executable by the computer to perform the method steps for automatically assessing medical ultrasound (US) image usability, the method comprising the steps of:
- extracting one or more features from at least one part of a medical ultrasound image;
- calculating for each feature a feature score for each pixel of said at least one part of said ultrasound image; and
- classifying one or more image pixels of said at least one part as either usable or unusable, based on a combination of feature scores for each pixel, wherein usable pixels have intensity values substantially representative of one or more anatomical structures.

15. The computer readable program storage device of claim 14, wherein extracting one or more features from the at least one part of the ultrasound image comprises:
- labeling each pixel in the at least one part with a label that is inversely proportional to the size of the region to which it belongs, to calculate a dark regions score for each pixel;
- scanning the at least one part of the image in each radial direction to measure a length of the at least one part from beginning to end, and assigning a grayscale value to each pixel indicating said length of the at least one part to which said pixel belongs, to calculate a radial extent score for each pixel;
- calculating a maximum edge score by detecting edges in the at least one part of said image and assigning each pixel in the at least one part a maximum gradient of the at least one part;
- forming for each pixel in the at least one part a vector in a feature space defined by its dark regions score, radial extent score, and maximum edge score; and
- classifying each pixel in the at least one part of the image as either a bright usable pixel, a dark usable pixel, or a dark-unusable pixel based on its feature vector, wherein a usable region includes the bright usable pixels and the dark usable pixels, and a unusable region contains dark unusable pixels.

16. The computer readable program storage device of claim 15, the method further comprising segmenting the image into bright and dark regions based on Otsu's criteria.

17. The computer readable program storage device of claim 16, wherein calculating a maximum edge score comprises calculating for each pixel in a bright region a gradient intensity for that pixel.

18. The computer readable program storage device of claim 15, the method further comprising calculating a local intensity score and a local variance score for each pixel in the at least one part, wherein the Local Intensity is an average of the local intensity, and the Local Variance is its variance, and incorporating said local intensity score and said local variance score as additional dimensions in said feature space.

19. The computer readable program storage device of claim 15, wherein said edges are detected using a Sobel filter on the image.

20. The computer readable program storage device of claim 15, the method further comprising calculating a mean edge score by assigning each pixel in the at least one part the mean gradient of the at least one part, and incorporating said mean edge score as an additional dimension in said feature space.

21. The computer readable program storage device of claim 14, the method further comprising training a 3-class classifier on pixels of the at least one part of said image in a feature space defined by the feature scores for each feature that can classify a pixel as a bright usable pixel, a dark usable pixel, or a dark-unusable pixel, wherein the usable pixels include the bright usable pixels and the dark-usable pixels.

22. The computer readable program storage device of claim 21, wherein training a 3-class classifier comprises training a binary classifier to determine whether or not a pixel is a bright pixel or a dark pixel, and training a binary classifier to determine whether the dark pixel is a dark-usable pixel or a dark-unusable pixel.

23. The computer readable program storage device of claim 22, wherein said binary classifier is a support vector machine.

* * * * *